(12) United States Patent
Sakagawa et al.

(10) Patent No.: US 7,965,304 B2
(45) Date of Patent: Jun. 21, 2011

(54) IMAGE PROCESSING METHOD AND IMAGE PROCESSING APPARATUS

(75) Inventors: Yukio Sakagawa, Tokyo (JP); Tsuyoshi Kuroki, Tokyo (JP); Hideo Noro, Tokyo (JP); Masakazu Fujiki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 723 days.

(21) Appl. No.: 11/476,587

(22) Filed: Jun. 29, 2006

(65) Prior Publication Data
US 2007/0006091 A1 Jan. 4, 2007

(30) Foreign Application Priority Data

Jun. 30, 2005 (JP) .................................. 2005-193077
Dec. 9, 2005 (JP) .................................. 2005-356681

(51) Int. Cl.
*G09G 5/00* (2006.01)

(52) U.S. Cl. ............ 345/633; 345/7; 345/426; 345/427; 348/51; 715/711

(58) Field of Classification Search .................... 348/51; 382/154
See application file for complete search history.

(56) References Cited

U.S. PATENT DOCUMENTS

| | | | |
|---|---|---|---|
| 6,636,627 B1 * | 10/2003 | Oosawa | 382/154 |
| 6,667,741 B1 * | 12/2003 | Kataoka et al. | 345/426 |
| 6,970,166 B2 | 11/2005 | Kuroki et al. | 345/428 |
| 7,053,916 B2 | 5/2006 | Kobayashi et al. | 345/633 |
| 7,446,767 B2 * | 11/2008 | Takizawa et al. | 345/426 |
| 2002/0057280 A1 * | 5/2002 | Anabuki et al. | 345/633 |
| 2002/0101506 A1 * | 8/2002 | Suzuki | 348/51 |
| 2003/0137524 A1 * | 7/2003 | Anabuki et al. | 345/633 |
| 2003/0179218 A1 * | 9/2003 | Martins et al. | 345/633 |
| 2004/0001059 A1 * | 1/2004 | Pfister et al. | 345/419 |
| 2004/0004583 A1 * | 1/2004 | Ogawa et al. | 345/7 |
| 2004/0109009 A1 * | 6/2004 | Yonezawa et al. | 345/632 |
| 2004/0166914 A1 * | 8/2004 | Ishihata et al. | 463/2 |
| 2005/0116964 A1 | 6/2005 | Kotake et al. | 345/629 |
| 2005/0131857 A1 | 6/2005 | Fujiki et al. | 707/1 |
| 2005/0164790 A1 * | 7/2005 | Goden et al. | 463/36 |
| 2005/0212801 A1 | 9/2005 | Kuroki et al. | 345/428 |
| 2006/0012675 A1 * | 1/2006 | Alpaslan et al. | 348/51 |
| 2006/0017725 A1 | 1/2006 | Fujiki | 345/419 |
| 2006/0046844 A1 * | 3/2006 | Kaneko | 463/32 |
| 2007/0024610 A1 | 2/2007 | Katano et al. | 345/418 |

OTHER PUBLICATIONS

Sato, Imari; Sato Yoichi; Ikeuchi Katsushi; "Estimation of Illumination Distribution by Using Soft Shadows", Center for Spatial Information Science, The University of Tokyo, Nov. 1998.*

* cited by examiner

*Primary Examiner* — Xiao M Wu
*Assistant Examiner* — Phi Hoang
(74) *Attorney, Agent, or Firm* — Fitzpatrick, Cella, Harper & Scinto

(57) ABSTRACT

A shadow body generation unit generates a shadow model defined by a limited number of lines extending from a position of a light source to an outline of a hand. If the virtual object is partially or fully included in the shadow model and a position of the virtual object is further away from the position of the light source, the shadow body generation unit generates a shadow for a partially obscured area included in the shadow model.

5 Claims, 18 Drawing Sheets

IMAGE PROCESSING METHOD AND IMAGE PROCESSING APPARATUS

FIELD OF THE INVENTION

The present invention relates to a technique for generating an image by superimposing a virtual object on a physical space.

BACKGROUND OF THE INVENTION

A mixed reality (MR) system provides to the user a mixed reality space image obtained by combining a physical space image and a virtual space image. They are generated in correspondence with the viewpoint position, line of sight direction, and the like, of the user. The MR system can present to the observer as if virtual objects ware existing in a physical space, and allows the observer to make an observation with a sense of actual dimensions and higher reality than a conventional virtual reality (VR) system.

On the other hand, designs (shapes and designs) using three-dimensional (3D) CAD have become mainstream in the design and manufacture fields. In this case, as a method of evaluating an object designed by 3DCAD, a method which displays data (solid format) created by the 3DCAD on the screen of a computer as a 3DCG and visually evaluates it, is commonly used.

In this case, a method of allowing the user to observe 3DCG data using an object manipulating device by combining both the aforementioned techniques, i.e., the above MR system and a 3DCAD technique is available. In order to set a manipulation function, the following method is used. A control panel is displayed within the MR space observed by the user and icons displayed on that panel are selected by a manipulation unit such as a stylus or the like.

An observation of the MR space is realized in four steps. First, by measuring a viewpoint position/direction and the like of a user in real time. Second, by acquiring a video of a physical space captured at the viewpoint position/direction by using a video camera, or the like. Third, by composing the video and a virtual object (CG object) viewed from the viewpoint position/direction of the user. Fourth, by displaying the composed result.

In order to measure a position and direction of a viewpoint of the user in real time, a system (a 6 degrees of freedom sensor, herein), which measures or estimates 6 degrees of freedom of a position and orientation, is used. For example, in the case of using the general measurement system of a position and orientation, 6 degrees of freedom of a position and orientation of a receiver having a size of a few centimeters square can be measured.

By associating the measured 6 degrees of freedom with a position and direction of a virtual camera in a virtual space, the MR space can be observed.

Upon operating a CG object in the MR space, the method of associating a position and orientation of a 6 degrees of freedom sensor different from a sensor used to detect a viewpoint and line of sight of a user with an object coordinate system of the CG object, by using the 6 degrees of freedom sensor, is disclosed. A CG object moves and rotates upon moving and rotating of a receiver by associating the measured value with the object coordinate system.

By the method above, the MR space that is generated from a physical space including virtual objects can be observed. However, it is problematic because a virtual object always superimposes on a physical object even if the physical object is in front of the virtual object.

In order to solve the above problem, there is a method for preparing a CG model of a physical object, which utilizes transparency for a physical image and opacity for a CG image. By using this method, the problem can be solved. However, a CG model of a physical object must be prepared. The method is suitable for a stationary object such as a desk and a chair arranged in a physical space in advance. However, the method is unsuitable for an object such as the hand of a user. Because it must measure the position and shape of "hand of a user", changing its shape freely in real time and then generate a model thereof. It is very difficult or impossible to measure the shape of an object changing dynamically in real time and generate a model thereof.

In order to cope with superimposition of the hand of a user, there is a technique of hand over lay. According to this technique, CG is not drawn on an area of a user's hand within an image captured by a camera, or a physical image of user's hand is drawn on an image generated based on conventional art. There are some techniques for extracting an area of a hand, for example only hand color (flesh color) can be extracted by performing chromakey processing.

However, in the MR system, when the user is about to select a CG icon in a virtual environment using an actual pointing device, he or she cannot easily recognize a relative positional relationship such as depth ordering or the like, and it is difficult for him or her to select such icon.

Furthermore, upon making such operation in the MR space, the problem of superimposition of a hand occurs. However, even using the conventional hand over lay method in order to solve that problem, a shadow of a physical object such as a hand cannot be clearly expressed.

SUMMARY OF THE INVENTION

The present invention has been made in consideration of the above problems, and has as its object to provide a technique for clearly displaying a relative positional relationship between a virtual object and a physical object when a virtual object is superimposed on a physical space.

In order to achieve an object of the present invention, for example, an image processing method of the present invention comprises the following arrangement.

That is, an image processing method including, a first setting step of setting a first light source used to irradiate a virtual space with light, a layout step of laying out a virtual object in the virtual space, a first acquiring step of acquiring a position and orientation of a viewpoint of an observer, and a generation step of generating an image of the virtual space, irradiated with light from the first light source, viewed from a viewpoint having a position and orientation acquired in the first acquiring step, the method comprising:

a second setting step of setting a second light source used to irradiate the virtual space with light;

a second acquiring step of acquiring a position and orientation of a physical object in a physical space;

a calculating step of calculating a region defined by a plurality of lines extending from a position of the second light source to an outline of the physical object;

a first determining step of determining whether or not the virtual object is partially or fully included in the region;

a second determining step of determining whether or not a position of the virtual object is further away from a position of the second light source than a position of the physical object; and a generating step of generating, if the virtual object is partially or fully included in the region and a position of the virtual object is further away from a position of the second light source than a position of the physical object, a shadow for partially obscured area.

In order to achieve an object of the present invention, for example, an image processing method of the present invention comprises the following arrangement.

That is, an image processing method for generating an image obtained by superimposing an image of a virtual space onto a physical space, comprising:

a first input step of inputting a position and orientation of a viewpoint of an observer;

a second input step of inputting a position and orientation of a tool to be manipulated by the observer;

a setting step of setting a light source used to irradiate the virtual space with light;

a layout step of laying out, in the virtual space, an object to be manipulated as a virtual object at a position and orientation; and a generation step of generating the image of the virtual space including the object to be manipulated, which is seen from the viewpoint at the position and orientation input in the first input step, and in that the generation step comprises:

a judging step of judging based on the position and orientation of the tool input in the second input step whether or not the tool is partially located between the light source and the object to be manipulated; and a projecting step of generating an image, which is formed by projecting an image of the tool onto the object to be manipulated in an irradiation direction of light from the light source to the object to be manipulated, on the object to be manipulated, when it is judged in the judging step that the tool is partially located between the light source and the object to be manipulated.

In order to achieve an object of the present invention, for example, an image processing apparatus of the present invention comprises the following arrangement.

That is, an image processing apparatus, comprising:

first setting unit adapted to set a first light source used to irradiate a virtual space with light;

layout unit adapted to lay out a virtual object in the virtual space;

first acquiring unit adapted to acquire a position and orientation of a viewpoint of an observer;

generation unit adapted to generate an image of the virtual space, irradiated with light from the first light source, viewed from a viewpoint having a position and orientation acquired by the first acquiring unit;

second setting unit adapted to set a second light source used to irradiate the virtual space with light;

second acquiring unit adapted to acquire a position and orientation of a physical object in a physical space;

calculating unit adapted to calculate a region defined by a plurality of lines extending from a position of the second light source to an outline of the physical object;

first determining unit adapted to determine whether or not the virtual object is partially or fully included in the region;

second determining unit adapted to determine whether or not a position of the virtual object is further away from a position of the second light source than a position of the physical object; and shadow lay out unit adapted to lay out, if the virtual object is partially or fully included in the region and a position of the virtual object is further away from a position of the second light source than a position of the physical object, an image indicating a shadow for partially obscured area.

In order to achieve an object of the present invention, for example, an image processing apparatus of the present invention comprises the following arrangement.

That is, an image processing apparatus for generating an image obtained by superimposing an image of a virtual space onto a physical space, comprising:

first input unit adapted to input a position and orientation of a viewpoint of an observer;

second input unit adapted to input a position and orientation of a tool to be manipulated by the observer;

setting unit adapted to set a light source used to irradiate the virtual space with light;

layout unit adapted to lay out, in the virtual space, an object to be manipulated as a virtual object at a position and orientation; and generation unit adapted to generate the image of the virtual space including the object to be manipulated, which is seen from the viewpoint at the position and orientation input by the first input unit, and in that the generation unit comprises:

judging unit adapted to judge based on the position and orientation of the tool input by the second input unit whether or not the tool is partially located between the light source and the object to be manipulated; and projecting unit adapted to generate an image, which is formed by projecting an image of the tool onto the object to be manipulated in an irradiation direction of light from the light source to the object to be manipulated, on the object to be manipulated, when the judging unit judges that the tool is partially located between the light source and the object to be manipulated.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
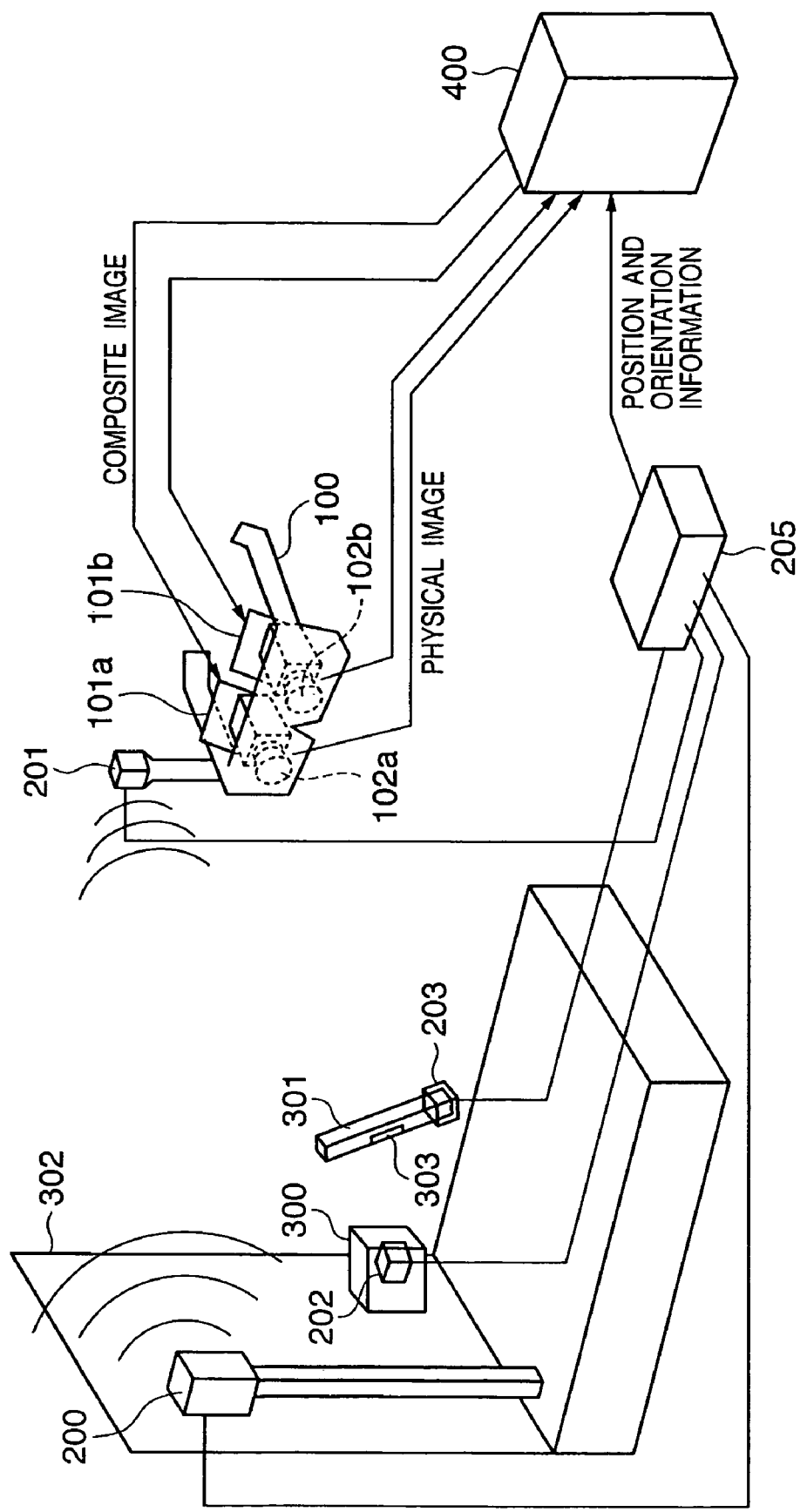
FIG. 1 is a view showing the outer appearance of a system according to the first embodiment of the present invention, which provides, to the observer, an MR space obtained by superimposing a virtual space on a physical space and allows the observer to browse and manipulate a virtual object on the virtual space.

FIG. 1 is a view showing the outer appearance of a system according to the first embodiment, which provides, to the observer, an MR space obtained by superimposing a virtual space on a physical space and allows the observer to browse and manipulate a virtual object on the virtual space.

Referring to FIG. 1, reference numeral 200 denotes a transmitter which generates a magnetic field. Reference numeral 100 denotes a head mounted display (to be referred to as an HMD hereinafter), which is mounted on the head of the observer to present images formed by combining a physical space and virtual space to positions before eyes. The HMD 100 comprises cameras 102a and 102b, display devices 101a and 101b, and a magnetic receiver 201.

Cameras 102a and 102b respectively continuously capture the physical space which is seen from the right and left eyes of the observer who wears the HMD 100 on the head, and output the captured frame images to a computer 400. In the following description, cameras 102a and 102b will also be generally referred to as a "viewpoint of the observer".

The display devices 101a and 101b are attached to the HMD 100 so as to be located in front of the right and left eyes when the observer wears the HMD 100 on the head, and display images based on image signals output from the computer 400. Therefore, images generated by the computer 400 are presented to the positions before the right and left eyes of the observer.

The magnetic receiver 201 detects a change in magnetic field generated by the transmitter 200, and outputs a detection result signal to a position and orientation measuring device 205. The detection result signal indicates a change in magnetic field which is detected in correspondence with the position and orientation of the magnetic receiver 201 on a coordinate system (to be referred to as a sensor coordinate system hereinafter) which has the position of the transmitter 200 as an origin, and three axes perpendicular to each other at the position of this origin as x-, y-, and z-axes. The position and orientation measuring device 205 obtains the position and orientation of the magnetic receiver 201 on the sensor coordinate system based on this signal, and outputs data indicating the obtained position and orientation to the computer 400.

Figure 2:
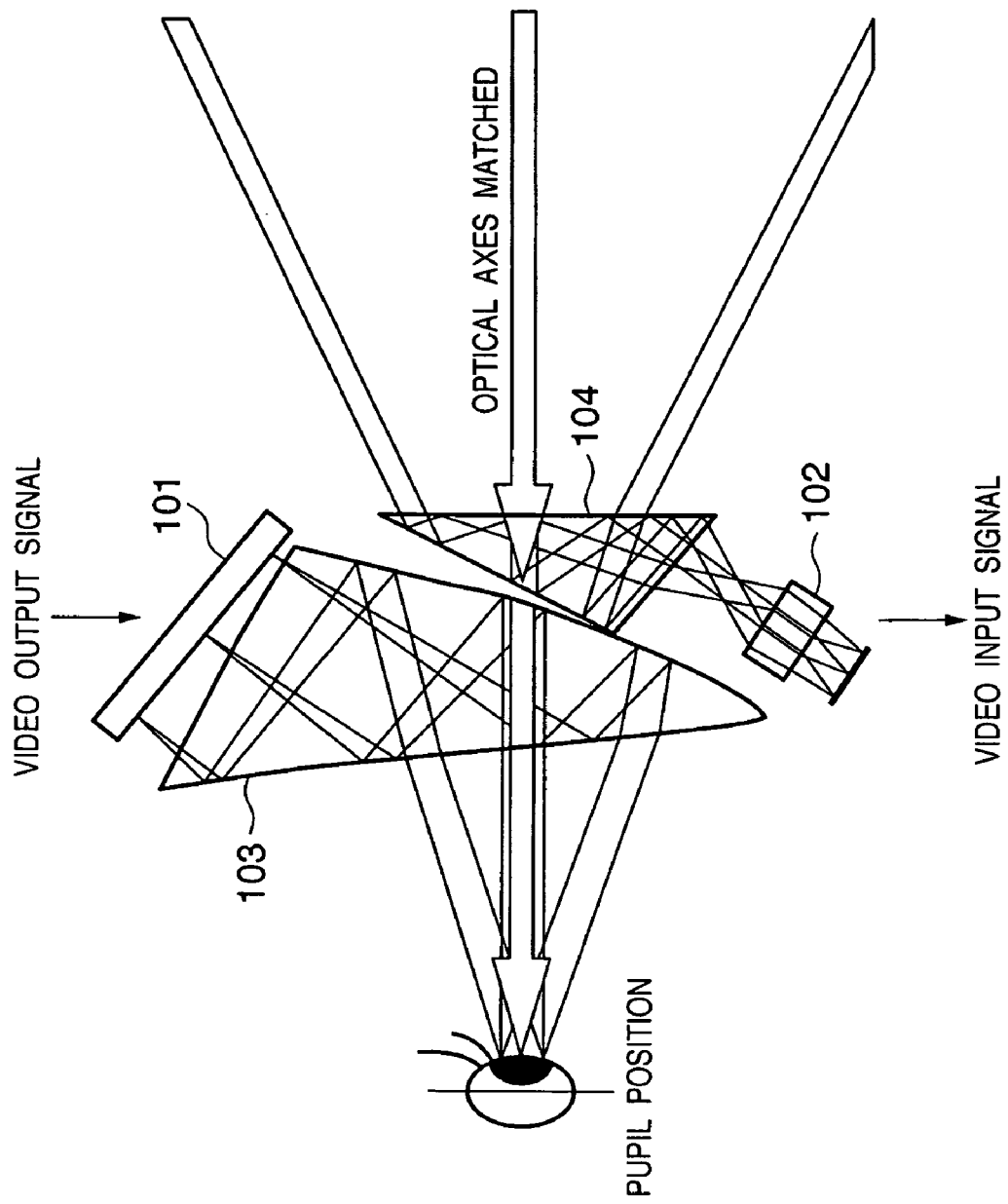
FIG. 2 is a view showing the detailed structure of an HMD 100.

FIG. 2 shows the detailed structure of the HMD 100.

Reference numeral 101 denotes a video display device, which comprises a compact liquid crystal display device of 0.5 to several inches. Reference numeral 103 denotes a sculptured surface prism which serves as a lens that scales up an image of the video display device 101. With this arrangement, an image displayed on the video display device 101 is presented as an image equivalent to that of 90 inches to, e.g., a position 2 m ahead of the observer.

Reference numeral 102 denotes a video input device which comprises an imaging device such as a CCD camera, CMOS camera, or the like. Reference numeral 104 denotes an imaging system prism which serves as a lens for converging light on the physical space to the video input device 102. Since the imaging system prism 104 is arranged outside the sculptured surface prism 103 so that their optical axes agree with each other, the parallax between an image input by the video input device 102 and that displayed on the video display device 101 is removed, thus naturally reproducing an image of the physical space.

Referring back to FIG. 1, reference numeral 300 denotes a 3D pointing device which includes a magnetic receiver 202. When the observer changes the position and orientation of the 3D pointing device 300 in his or her hand, this magnetic receiver 202 outputs a signal indicating a change in magnetic field detected in accordance with its own position and orientation on the sensor coordinate system to the position and orientation measuring device 205 as in the magnetic receiver 201. The signal indicating a change in magnetic field indicates the position and orientation of the magnetic receiver 202 itself on the sensor coordinate system, and the position and orientation measuring device 205 can obtain the position and orientation of the magnetic receiver 202 on the sensor coordinate system based on this signal. The obtained data indicating the position and orientation is output to the computer 400. This 3D pointing device 300 is manipulated by the observer in his or her hand to change the position and orientation of a virtual object (a virtual object to be observed) associated in advance with the 3D pointing device 300.

Reference numeral 301 denotes a 3D pointing device which is used for a use purpose different from that of the 3D pointing device 300, and comprises a magnetic receiver 203 as that in the 3D pointing device 300. With this arrangement, the position and orientation of the magnetic receiver 203 itself on the sensor coordinate system can be obtained as in the magnetic receiver 202. The 3D pointing device 301 is used as a tool for manipulating a control panel as a virtual object laid out on the virtual space. Hence, in order to obtain the position and orientation of a part pointed by the pointing device 301, the magnetic receiver 203 is attached to a pointing part in the pointing device 301. For example, when the observer holds one end of the pointing device 301 with the hand, he or she points to the control panel at the other end of the pointing device 301. Hence, the magnetic receiver 203 is attached to the other end of the pointing device 301. A manipulation button 303 is also provided to this 3D pointing device 301. How to use this manipulation button 303 will be described later.

Reference numeral 400 denotes a computer which performs processing for generating image signals to be output to the display devices 101*a* and 101*b* of the HMD 100, and receiving and managing data from the position and orientation measuring device 205.

Figure 3:
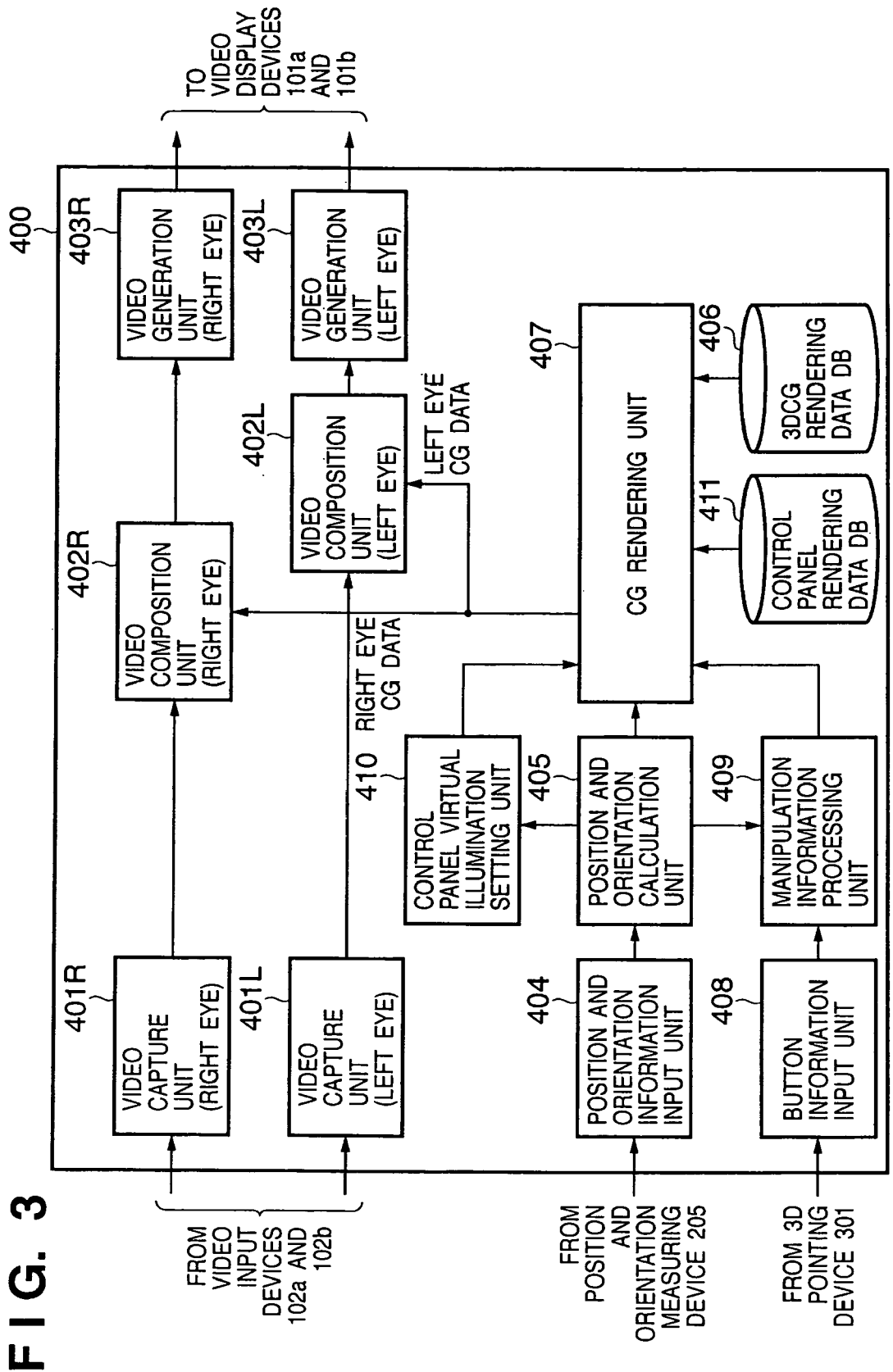
FIG. 3 is a block diagram showing the functional arrangement of a computer 400.

FIG. 3 is a block diagram showing the functional arrangement of this computer 400. In this embodiment, respective units shown in FIG. 3 are implemented by hardware.

Reference numerals 401R and 401L denote video capture units, which respectively capture images input from cameras 102*a* and 102*b* as digital signals.

Reference numeral 404 denotes a position and orientation information input unit, which fetches data output from the position and orientation measuring device 205. This data includes the data indicating the position and orientation of the magnetic receiver 201 on its sensor coordinate system, the data indicating those of the magnetic sensor 202 of the 3D pointing device 300 on its sensor coordinate system, and the data indicating those of the magnetic sensor 203 of the 3D pointing device 301 on its sensor coordinate system.

Reference numeral 408 denotes a button information input-unit which receives a signal indicating pressing of the manipulation button 303 of the 3D pointing device 301 upon pressing of it, and outputs the received signal to a manipulation information processing unit 409. Note that the manipulation button 303 may be provided to a device other than the 3D pointing device 301, and may be a button provided to, e.g., a keyboard or mouse (not shown) connected to the computer 400.

Reference numeral 411 denotes a control panel rendering data DB (database) which is that for data used to generate an image of the control panel (control panel rendering data). The control panel rendering data includes data indicating the geometric shape and colors, texture data, data indicating the position and orientation, and the like, of the control panel.

Note that the control panel is preferably laid out on the virtual space, so that its manipulation surface is always seen at a fixed position in the display devices 101*a* and 101*b*. That is, a relative position and orientation relationship between the position and orientation of the control panel and those of the head of the observer is preferably fixed. Therefore, the "data indicating the position and orientation of the control panel" included in the control panel rendering data are bias data to those of the display devices 101*a* and 101*b*. That is, by adding these bias data to the positions and orientations of the display devices 101*a* and 101*b*, the position and orientation relationship between the display device 101*a* and the control panel and that between the display device 101*b* and the control panel are fixed. Hence, the control panel is displayed at the fixed position in the display devices 101*a* and 101*b*. Details will be described later.

Reference numeral 406 denotes a 3DCG rendering data DB, which is a DB for data (3DCG rendering data) used to generate images of virtual objects (including a virtual object to be observed) other than the control panel, which form the virtual space. The 3DCG rendering data includes data indicating the geometric shape and colors, texture data, data indicating the position and orientation, and the like, of each of such virtual objects. Also, this 3DCG rendering data includes data of a light source (the type, position, irradiation direction, and the like, of a light source) used to irradiate the virtual objects other than the control panel with light.

Reference numeral 405 denotes a position and orientation calculation unit. When the data indicating the position and orientation, in the sensor coordinate system, of the magnetic receiver 202 of the 3D pointing device 300 is input from the position and orientation information input unit 404, the position and orientation calculation unit 405 calculates the position and orientation, in the virtual space, of the magnetic receiver 202 of the 3D pointing device 300 using this data and conversion data between the sensor coordinate system and virtual space by a known calculation method. The conversion data between the sensor coordinate system and virtual space represents the relationship between the position and orientation on the virtual space and those on the sensor coordinate system. With this conversion data, the position and orientation on one coordinate system can be converted into those on the other coordinate system. Note that the position and orientation of the virtual object which is associated in advance with this 3D pointing device 300 are updated to the calculated position and orientation.

When the data indicating the position and orientation of the magnetic receiver 203 of the 3D pointing device 301 is input from the position and orientation information input unit 404, the position and orientation calculation unit 405 calculates the position and orientation of the magnetic receiver 203 of the 3D pointing device 301 using this data and the above conversion data between the sensor coordinate system and virtual space by the known calculation method.

When the data indicating the position and orientation of the magnetic receiver 201 is input from the position and orientation information input unit 404, the position and orientation calculation unit 405 calculates the position and orientation of the magnetic receiver 201 using this data and the above conversion data between the sensor coordinate system and virtual space by the known calculation method. When data indicating the position and orientation relationships between the magnetic receiver 201 and cameras 102*a* and 102*b* are used, the positions and orientations of cameras 102*a* and 102*b* on the virtual space can be calculated by the known calculation method. Assume that the data required to calculate the positions and orientations of cameras 102*a* and 102*b* on the virtual space from those of the magnetic receiver 201 on its sensor coordinate system are given as known data in this embodiment.

Reference numeral 409 denotes a manipulation information processing unit, which executes processing for determining a part of the control panel pointed by the pointing device 301 based on the relative positional relationship between the magnetic receiver 203 (pointing device 301) and the control panel.

Reference numeral 410 denotes a control panel virtual illumination setting unit, which sets a light source used to irradiate the control panel laid out on the virtual space with light. As is well known, in order to generate the image of the virtual space, one or more light sources must be set on the virtual space. Also, as for the virtual objects other than the control panel, as described above, the 3DCG rendering data includes data associated with the light source required to irradiate the virtual objects other than the control panel with light. Hence, the virtual objects are irradiated with light according to the irradiation conditions indicated by this data.

Reference numeral 407 denotes a CG rendering unit which generates images of the virtual object, which are seen according to the positions and orientations of cameras 102a and 102b calculated by the position and orientation calculation unit 405. As described above, the image of the virtual object associated with the 3D pointing device 300 is laid out on the virtual space to have the position and orientation of the 3D pointing device 300. The control panel is laid out on the virtual space to have the position and orientation obtained by adding the position and orientation according to the control panel rendering data to those of cameras 102a and 102b. Hence, the CG rendering unit 407 generates images which are seen when the virtual object is observed at the positions and orientations of cameras 102a and 102b calculated by the position and orientation calculation unit 405. Note that upon image generation, the control panel is irradiated with light coming from the light source set by the control panel virtual illumination setting unit 410, and the virtual objects other than the control panel are irradiated with light according to the irradiation conditions included in the 3DCG rendering data.

Since the processing for generating an image of a virtual object which can be seen from a viewpoint having a given position and orientation is a state-of-the-art technique, a detailed description thereof will be omitted.

Reference numerals 402R and 402L denote video composition units, which superimpose the images of the virtual object, which are generated by the CG rendering unit 407 and are to be seen according to the positions and orientations of cameras 102a and 102b, onto the images of the physical space input from the video capture units 401R and 401L respectively. The video composition units 402R and 402L output these images to video generation units 403R and 403L, respectively. In this way, the image on the MR space, which is to be seen according to the position and orientation of the camera 102a, and that on the MR space, which is to be seen according to the position and orientation of the camera 102b, can be generated.

The video generation units 403R and 403L respectively convert the images on the MR space, which are output from the video composition units 402R and 402L into analog signals, and outputs the converted analog signals to the display devices 101a and 101b as video signals. In this way, the images on the MR space which correspond to the two eyes are displayed before the right and left eyes of the observer who wears the HMD 100 on the head.

Figure 4:
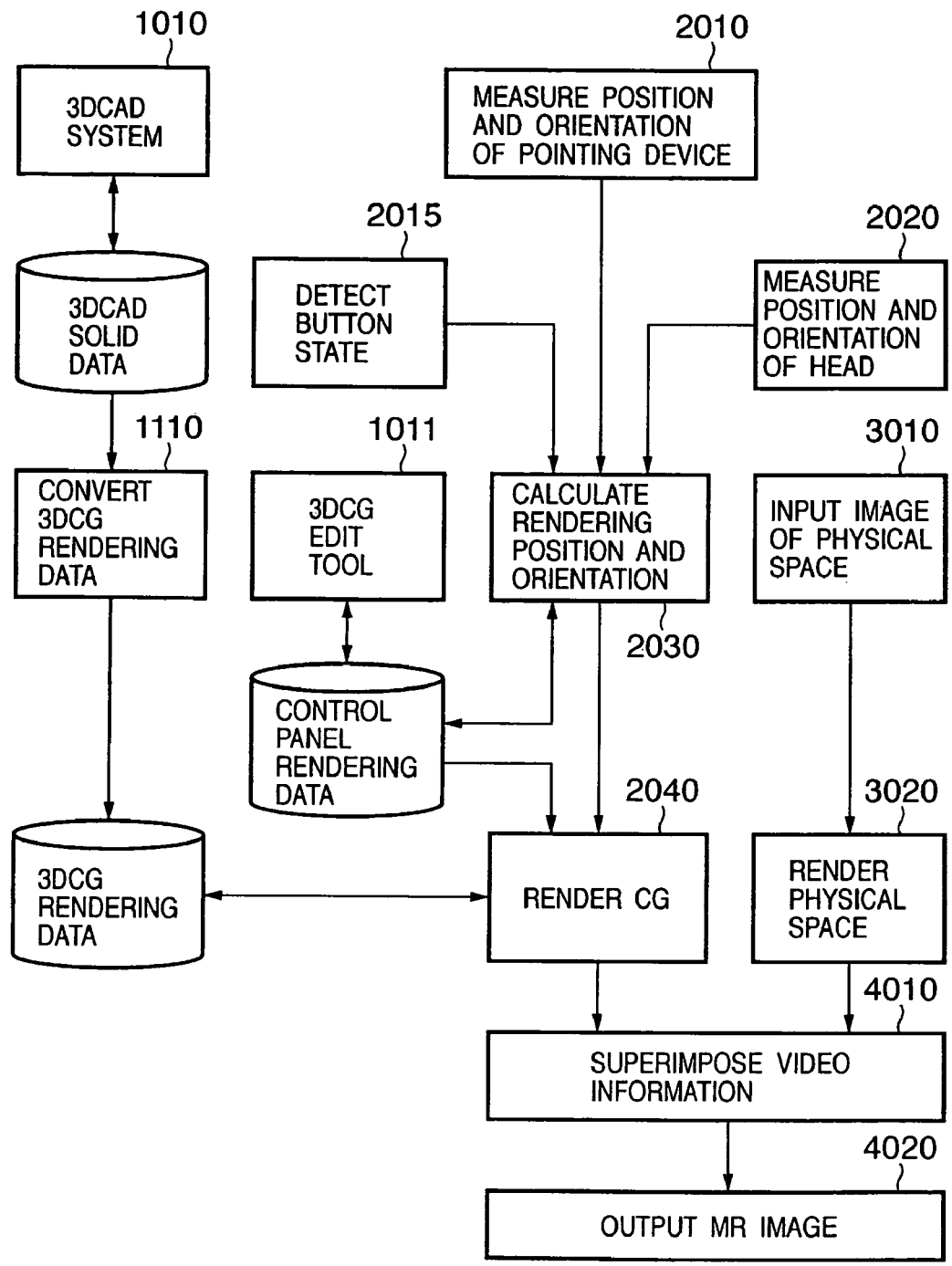
FIG. 4 is a chart showing the flow of generation processing of an image on an MR space.

The generation processing of an image on the MR space will be described below using FIG. 4. FIG. 4 is a chart showing the flow of this processing.

The processing sequence for generating the 3DCG rendering data from 3DCAD data will be described first with reference to the left side of FIG. 4.

Normally, in the case of a design task (1010) such as a shape, design, and the like, using a 3D CAD system, it is a common practice to save 3DCAD data as solid data unique to each individual 3D CAD system. The virtual object to be observed is created based on this solid data using a rapid prototyping apparatus such as stereo lithography or the like.

On the other hand, 3D solid data is expressed as a set of geometric parameters of respective design parts, and cannot be rendered as a CG intact. Hence, the 3D solid data is converted into a data format (e.g., VRML or the like,) suited to render a 3DCG (1110). This MR system generates the virtual space using the 3DCG rendering data which is converted in this way. The generated 3DCG rendering data is saved in the 3DCG rendering data DB 406.

Figure 5:
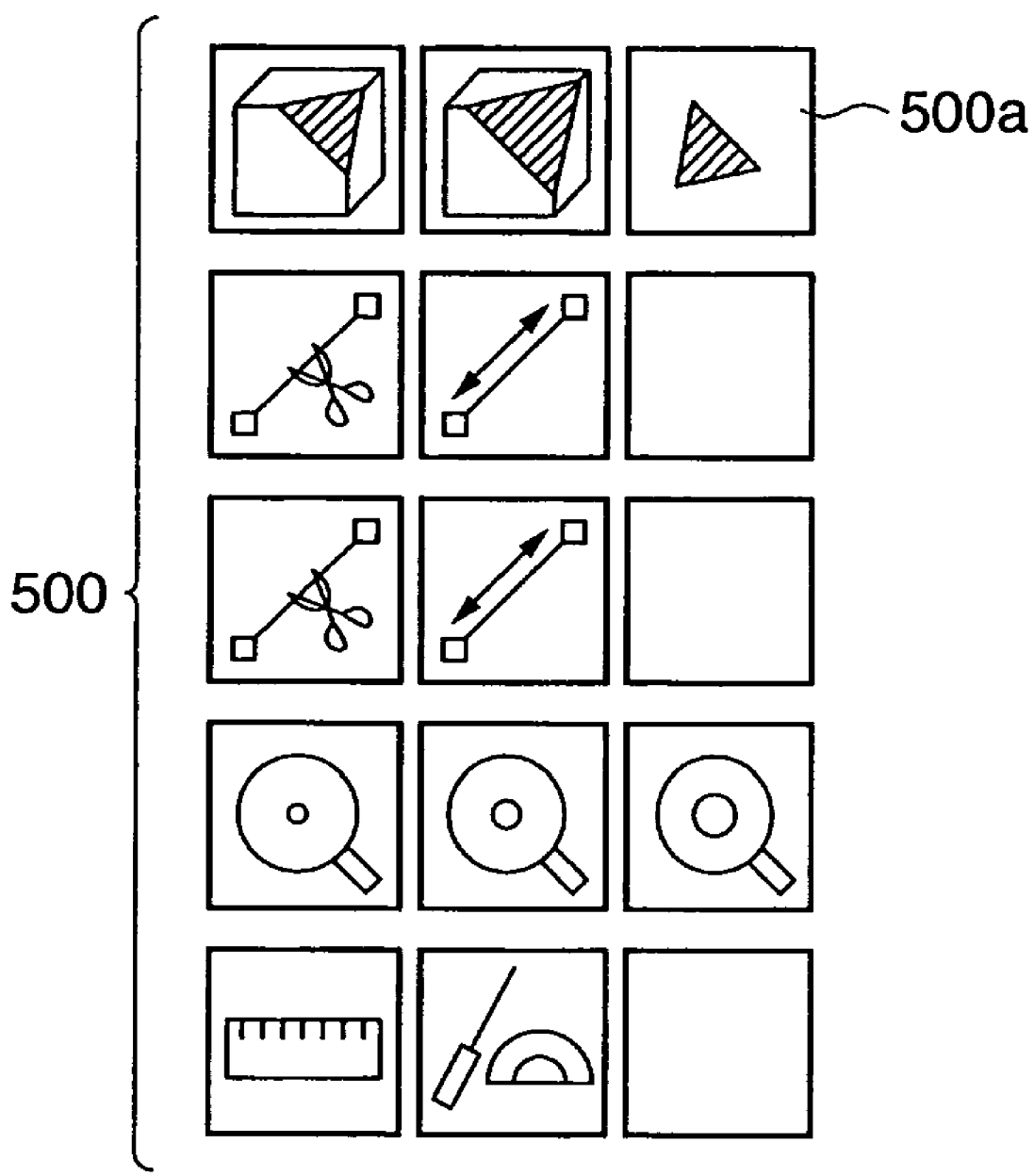
FIG. 5 shows a display example of a control panel 500 as a virtual object generated according to control panel rendering data.

FIG. 5 shows a display example of a control panel 500 as a virtual object created according to the control panel rendering data. As shown in FIG. 5, a plurality of button images (icons) are laid out on the control panel 500, and each of these icons is used to implement a corresponding function when it is designated. Reference numeral 500a denotes an example of such icon. Note that the configuration of the control panel is not limited to that shown in FIG. 5, and a three-dimensional structure may be adopted or the number of icons to be laid out may be increased to implement more complicated manipulations.

The processing for generating an image on the virtual space (that of the virtual object) using the 3DCG rendering data and control panel rendering data, and presenting the generated image to the observer while superimposing it on an image of the physical space will be described below with reference to the right side of FIG. 4.

The magnetic receiver 202 of the pointing device 300 measures a change in magnetic field generated by the magnetic transmitter 200 (2010), as described above. Since the magnetic receiver 202 outputs its measurement result as a signal to the position and orientation measuring device 205, the position and orientation measuring device 205 outputs data indicating the position and orientation of the magnetic receiver 202 on the sensor coordinate system to the computer 400 based on the received signal (2030).

Likewise, the magnetic receiver 201 measures a change in magnetic field generated by the magnetic transmitter 200 (2020), as described above, and outputs its measurement result as a signal to the position and orientation measuring device 205. The position and orientation measuring device 205 then outputs data indicating the position and orientation of the magnetic receiver 201 (when bias data are added to the position and orientation of the magnetic receiver 201, the positions and orientations of cameras 102a and 102b can be obtained, as described above) on the sensor coordinate system to the computer 400 based on the received signal (2030).

Also, the magnetic receiver 203 measures a change in magnetic field generated by the magnetic transmitter 200 (2020), as described above, and outputs its measurement result as a signal to the position and orientation measuring device 205. The position and orientation measuring device 205 then outputs data indicating the position and orientation of the magnetic receiver 203 on the sensor coordinate system to the computer 400 based on the received signal (2030).

The position and orientation calculation unit 405, CG rendering unit 407, and control panel virtual illumination setting unit 410 generate images of the "virtual object to be observed" and "control panel" which can be respectively seen from cameras 102a and 102b (2040).

Generation of the image of the "virtual object to be observed" will be described below. The position and orientation calculation unit 405 adds the bias data to the "data indicating the position and orientation of the magnetic receiver 201 to calculate the positions and orientations of cameras 102a and 102b on the sensor coordinate system in processing step 2030. Then, the position and orientation calculation unit 405 calculates the positions and orientations of cameras 102a and 102b on the virtual space using the conversion data.

Furthermore, the position and orientation calculation unit 405 calculates the position and orientation of the magnetic receiver 202 on the virtual space using the "position and orientation of the magnetic receiver 202" on the sensor coordinate system and the conversion data. If the relative position and orientation relationship between the virtual object to be observed and the magnetic receiver 202 is specified, the position and orientation of the virtual object to be observed need not be matched with those of the magnetic receiver 202.

The CG rendering unit 407 generates the images of the virtual object to be observed, which are seen from the positions and orientations of cameras 102a and 102b, using the "data indicating the positions and orientations of cameras 102a and 102b" and the "data indicating the position and orientation of the magnetic receiver 202". At this time, upon generating images of virtual objects including the virtual object to be observed (except for the control panel), those of the virtual images which are irradiated with light from a light source according to data associated with those included in the 3DCG rendering data are generated.

In this manner, since the processing for generating an image of a virtual object which can be seen from a viewpoint having a given position and orientation is a state-of-the-art technique, a detailed description thereof will be omitted.

On the other hand, generation of the image of the "control panel" will be described below. The position and orientation calculation unit 405 refers to data of the layout position and orientation of the control panel, which is included in the control panel rendering data, and adds the position and orientation indicated by this data to the "positions and orientations of cameras 102a and 102b on the virtual space" calculated previously, thus calculating the position and orientation of the control panel on the virtual space. In this way, as described above, the position and orientation relationship between cameras 102a and 102b and the control panel is fixed. Hence, the control panel is laid out on the virtual space at the calculated position and orientation. The CG rendering unit 407 generates images of the "control panel" which can be seen from the positions and orientations of cameras 102a and 102b using the "data indicating the positions and orientations of cameras 102a and 102b and the "data of the layout position and orientation of the control panel" which are calculated by the position and orientation calculation unit 405. On the other hand, when pointing is done by the manipulation button 303 of the pointing device 301, the button information input unit 408 receives a signal indicating pointing (2015).

On the other hand, the manipulation information processing unit 409 checks, with reference to the "data of the position and orientation of the magnetic receiver 203", the position of a part pointed (to be referred to as a pointed part hereinafter) by the pointing device 301 on the control panel, i.e., a part of the control panel pointed by the pointing device 301.

The control panel rendering data includes data which indicates an area occupied on the control panel by each of icons arranged on the control panel. Hence, by checking which icon area the position of the magnetic receiver 203 is located, the icon which is currently pointed can be determined. On the other hand, when the manipulation information processing unit 409 receives a signal indicating pressing of the manipulation button 303 from the button information input unit 408, it is determined that the currently pointed icon is manipulated.

With the above processing, the manipulation information processing unit 409 can acquire which icon is currently manipulated, and informs the CG rendering unit 407 of the manipulated icon. Hence, the CG rendering unit 407 changes the display color (e.g., texture) of the informed icon, thus specifying the currently selected icon. Upon generating the image of the control panel, that of the control panel while it is irradiated with light from a light source set by the control panel virtual illumination setting unit 410 is generated.

In this way, the images of the "virtual object to be observed" and "control panel" which can be seen according to the positions and orientations of cameras 102a and 102b (the image which can been seen according to the position and orientation of the camera 102a is that for the right eye, and the image which can been seen according to the position and orientation of the camera 102b is that for the left eye) can be generated.

As described above, the images of the virtual objects which include the virtual object to be observed and control panel and form the virtual space are generated.

On the other hand, parallel to processing steps 2010, 2015, 2020, 2030, and 2040, the images of the physical space captured by cameras 102a and 102b are input to video composition units 402R and 402L via video capture units 401R and 401L (3010), which render the input images on a memory (3020).

The video composition unit 402R superimposes the image for the right eye (the image of the virtual object) which is rendered by the CG rendering unit 407 on the image of the physical space for the right eye input from the video capture unit 401R, and outputs the superimposed image (the image of the MR space) to the video generation unit 403R (4010).

On the other hand, the video composition unit 402L superimposes the image for the left eye (the image of the virtual object) which is rendered by the CG rendering unit 407 on the image of the physical space for the left eye input from the video capture unit 401L, and outputs the superimposed image (the image of the ML space) to the video generation unit 403L (4010).

Upon superimposing the image of the virtual object on that of the physical space, the following processing is done. That is, the image of the virtual object which can be seen from the position and orientation of the camera 102a is superimposed on that of the physical space from the camera 102a. Furthermore, the image of the virtual object which can be seen from the position and orientation of the camera 102b is superimposed on that of the physical space from the camera 102b. As a result, the image of the MR space which can be seen from the right eye of the observer, and that of the MR space which can be seen from the left eye are generated.

The video generation units 403R and 403L respectively convert the received images of the MR space into video signals as analog signals, and output these video signals to the display devices 101a and 101b (4020).

Real-time information presentation is done by repeating the processing steps 2010 to 4020 at video updating intervals of the display devices (101a, 101b).

After the aforementioned processing, each of the icons arranged on the control panel as a virtual object can be pointed and selected using the pointing device 301. However, since the control panel is a virtual object and the pointing device 301 is a physical object, the operator hardly has a sense of distance if he or she moves the pointing device 301 closer to the control panel.

Hence, in this embodiment, when the pointing device 301 is partially or entirely located between the light source set by the control panel virtual illumination setting unit 410 and the control panel, an image of a shadow of the partial or entire pointing device 301 is generated on the control panel, thus notifying the operator of the distance between the pointing device 301 and the control panel.

Various methods of generating an image of the shadow may be used. An example of such methods will be described below.

Initially, the 3DCG rendering data DB 406 holds data of a model of a tool (to be referred to as a tool model hereinafter) as the virtual object which is laid out (but it is not always displayed) at the position and orientation of the pointing device 301. The data of the tool model need only include shape data of the tool model. Especially, since the tool model need not be rendered, other data (e.g., texture data and the like,) need not always be included.

The CG rendering unit 407 generates an image, which is obtained by projecting the tool model onto the control panel in the irradiation direction of light coming from a light source (to be referred to as a control panel light source) set by the control panel virtual illumination setting unit 410, on the control panel as that of the shadow of the pointing device 301. When the pointing device 301 is not partially or entirely located between the control panel light source and control panel, such image of the shadow is not generated and displayed since it is projected nowhere.

In this manner, the image of the shadow of the pointing device 301 can be generated on the control panel. Note that the shape of the tool model may faithfully reproduce that of the pointing device 301 or may be an appropriate shape. Also, the image of the shadow for only the pointing part of the pointing device 301 may be generated. Note that the technique for generating an image of the shadow of one virtual object on the other virtual object is known to those who are skilled in the art, and no more description will be given.

In the following description, a case will be explained below wherein the tool model is always laid out at the position and orientation of the pointing device 301 (it is not always displayed). However, the present invention may be applied to a case wherein the tool model is displayed.

Figure 6:
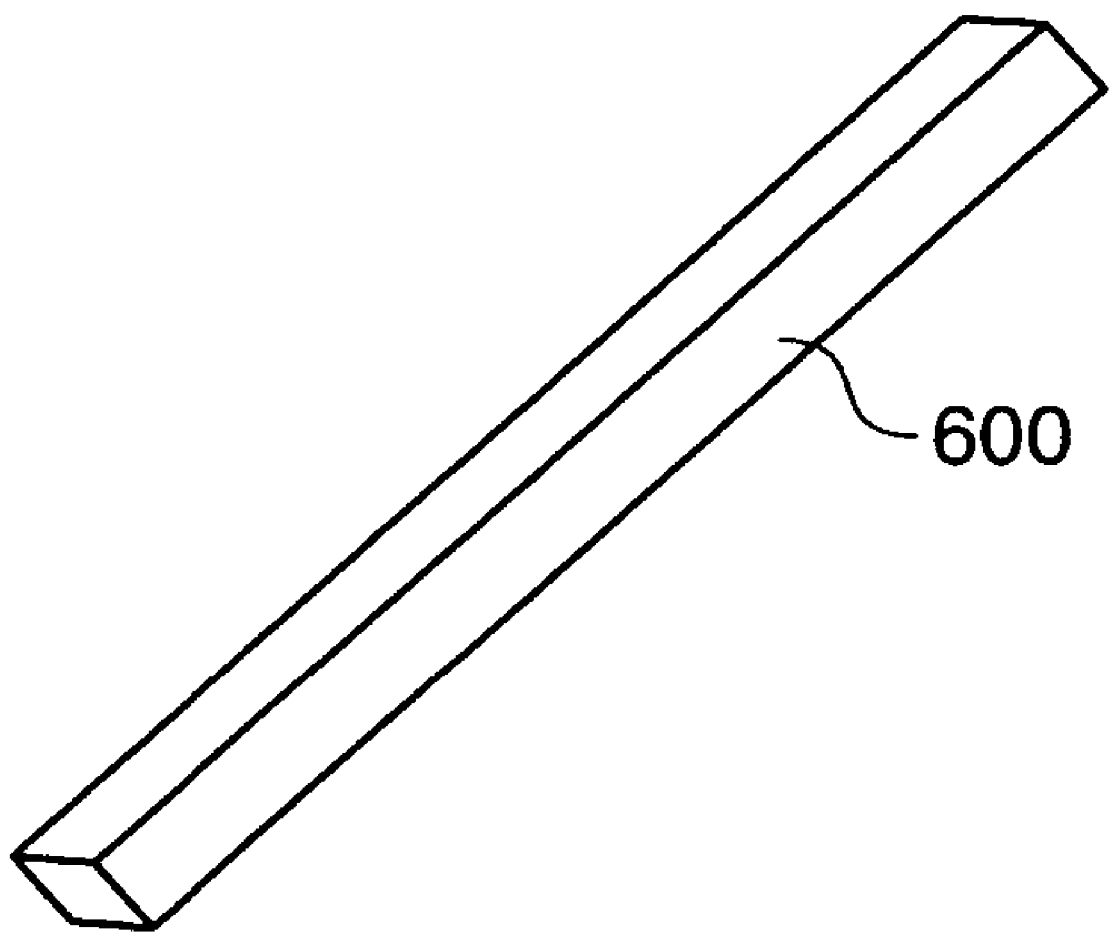
FIG. 6 shows an example of a tool model.

A control panel light source will be described below. In the following description, for example, the tool model has a quadratic prism shape, as shown in FIG. 6. However, the gist of the following description is not limited to such specific shape.

In this embodiment, a directional light type (illumination that radiates light rays in a given direction) is used as the type of control panel light source. However, the present invention is not limited to this specific type, and other light types such as a point light type (illumination that omnidirectionally radiates light rays from a specific position), a spot light type (illumination that conically emanates from a light source position), and the like, may be used. Furthermore, these light types may be combined. Also, in the description of this embodiment, the number of panel light sources is 3. However, the present invention is not limited to such specific value, and one or more light sources need only be set.

Figure 7:
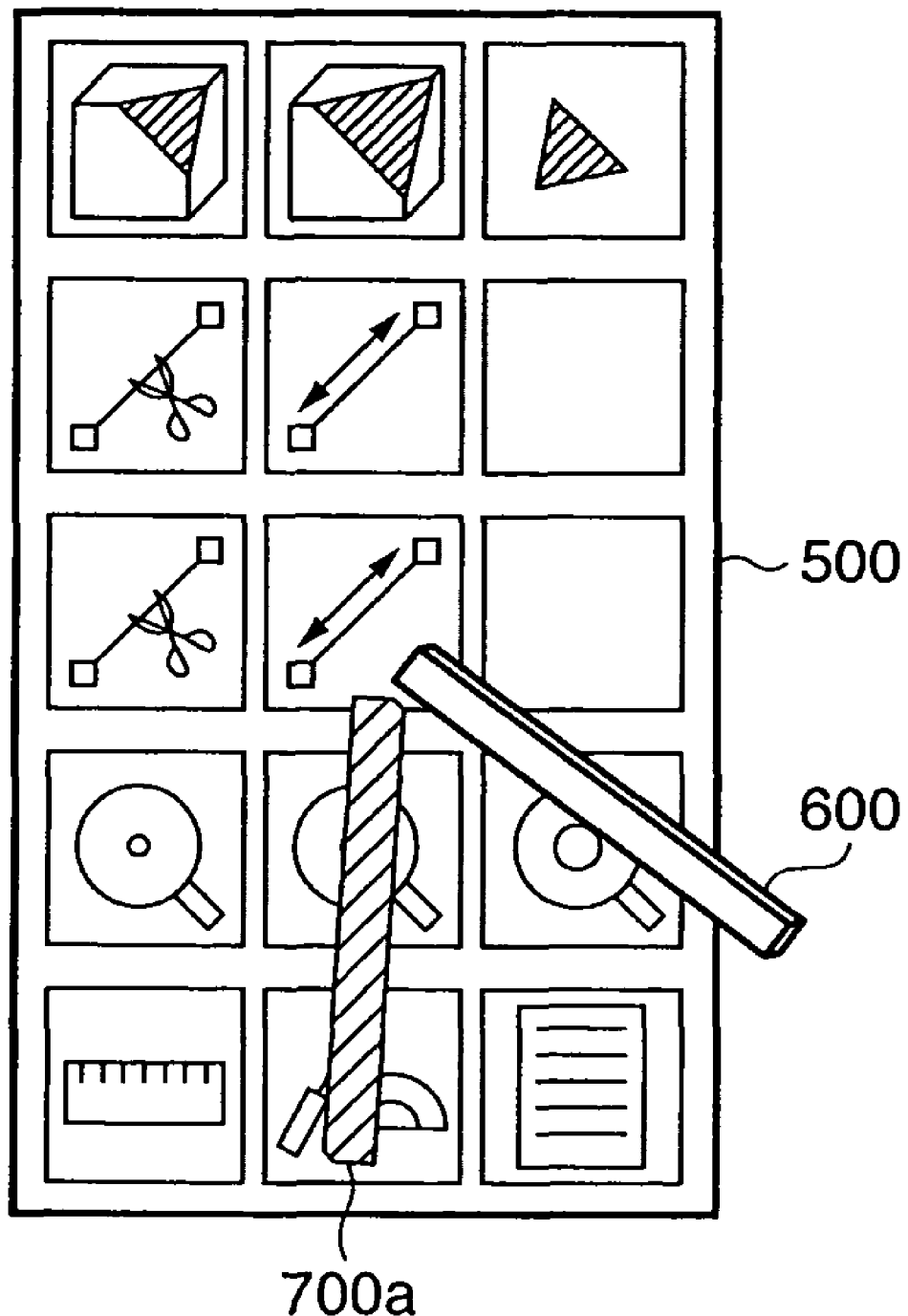
FIG. 7 shows a display example of an image of a shadow generated on the control panel when a pointing device 301 is moved close to the control panel shown in FIG. 5.

FIG. 7 shows a display example of an image of a shadow generated on the control panel when the pointing device 301 is moved closer to the control panel shown in FIG. 5. FIG. 7 shows a case wherein the number of control panel light sources is 1 for the sake of simplicity. As shown in FIG. 7, a shadow 700a is generated. The image of the shadow is generated, as described above, based on the tool model laid out at the position and orientation of the pointing device 301.

The directional light ray direction will be described next. In this embodiment, upon setting the control panel light source on the virtual space, there are two cases, i.e., a case wherein the "irradiation direction from the control panel light source is fixed with respect to the control panel" and a case wherein the "irradiation direction from the control panel light source is fixed with respect to the pointing device 301 (tool model)". These two cases will be explained below.

A case will be described first wherein the irradiation direction from the control panel light source is fixed with respect to the control panel. In order to drop the shadow of the pointing device 301 (tool model) on the control panel to be easy to see, the irradiation direction must have an angle of a given range with respect to the normal vector to the plane of the control panel. For example, if light rays come from an angle of 90° with respect to the normal vector, no shadow can be formed on the control panel.

Figure 8:
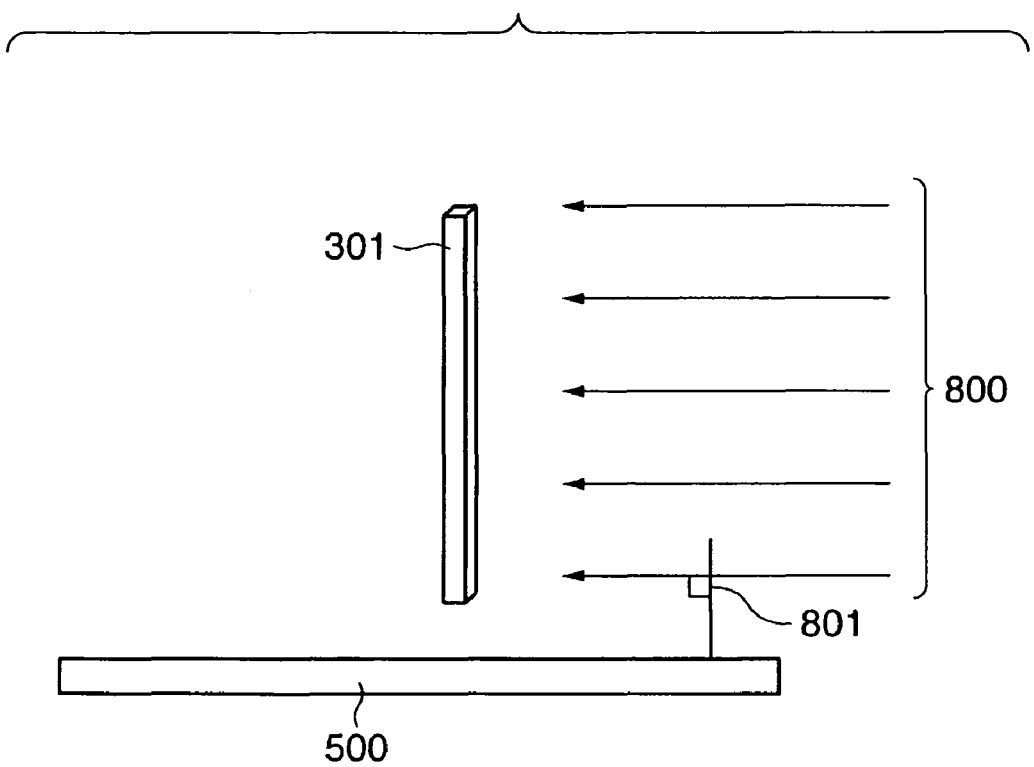
FIG. 8 shows the relationship between the plane of the control panel and irradiated light when the plane of the control panel is irradiated with light to form an angle of 90° with a normal to this plane.

FIG. 8 shows the relationship between the plane of the control panel and irradiated light when the plane of the control panel is irradiated with light to have an angle of 90° with respect to a normal to this plane. Referring to FIG. 8, reference numeral 500 denotes the plane of the control panel; 801, a normal vector to this plane; and 800, a direction of light irradiated from the control panel light source (directional light ray direction).

Figure 9:
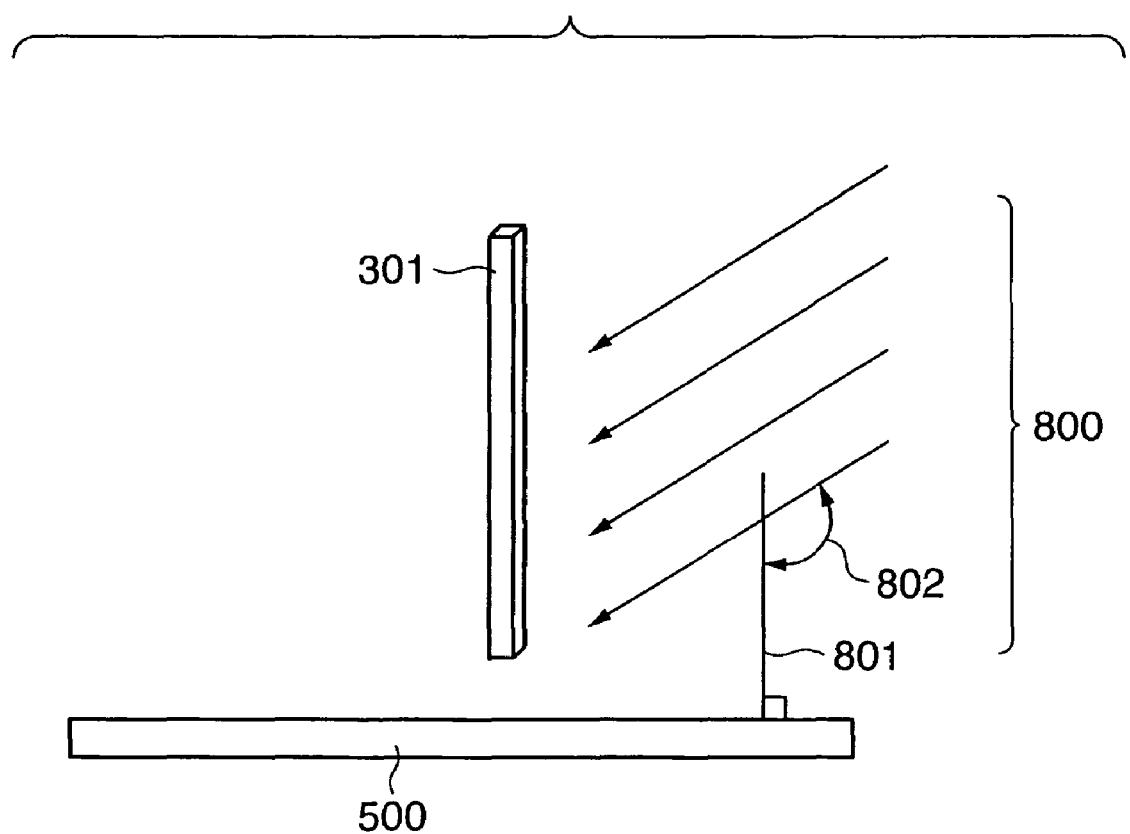
FIG. 9 shows the relationship between the plane of the control panel and irradiated light when the plane of the control panel is irradiated with light to form an arbitrary angle with a normal to this plane.

FIG. 9 shows the relationship between the plane of the control panel and irradiated light when the plane of the control panel is irradiated with light to have a given angle with respect to a normal to this plane. The same reference numerals in FIG. 9 denote the same parts as those in FIG. 8, and a description thereof will be omitted. In FIG. 9, the directional light ray direction 800 makes an angle 802 (≠90°) with the normal vector 801 to the plane of the control panel 500. In this embodiment, the angle 802 is equal to or larger than 90°. However, when a plurality of control panel light sources are set as in this embodiment and the angles 802 of these control panel light sources become closer to 180°, the plurality of panel light sources are reduced to one panel light source. Hence, the angle 802 has a given range to have 135° as the middle of 90° and 180° as the center.

A case will be described below wherein the irradiation direction from the control panel light source is fixed.

Figure 10:
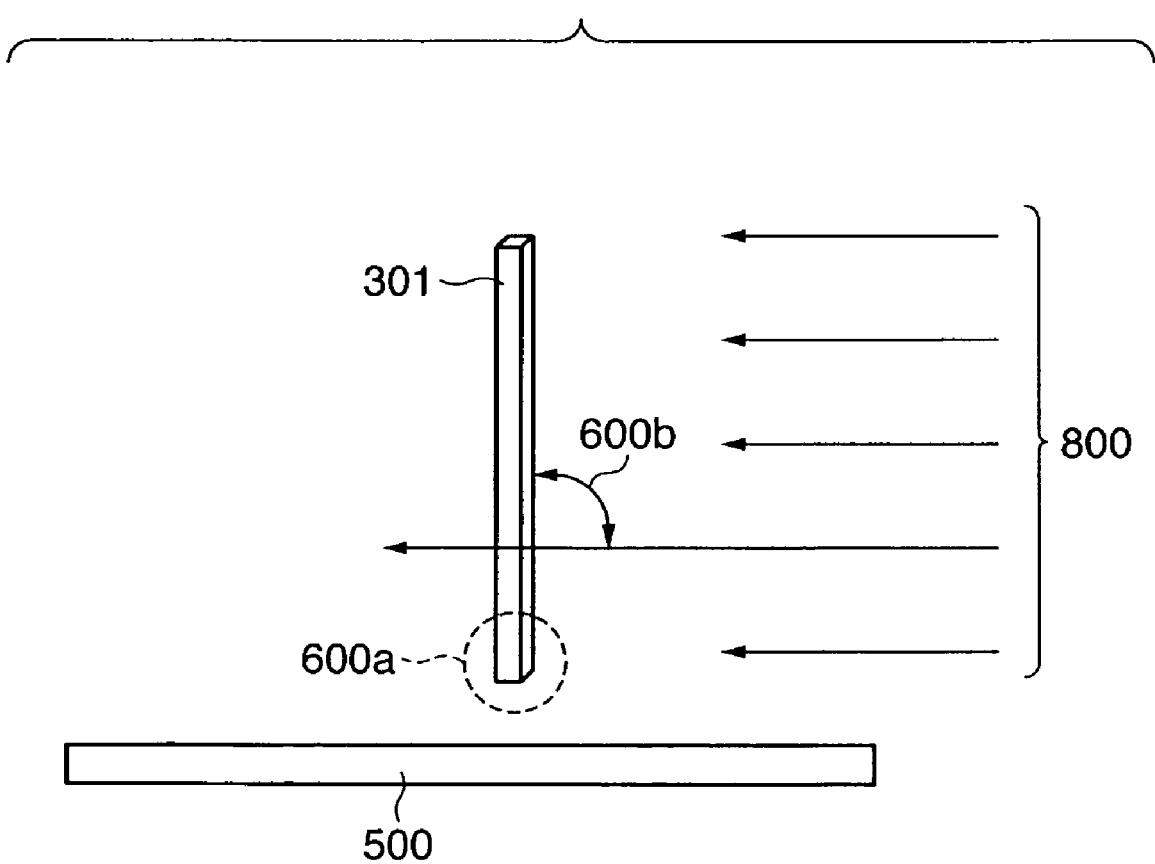
FIG. 10 shows the relationship between the pointing device 301 (tool model 600) and irradiated light when the pointing device 301 (tool model 600) is irradiated with light to form an arbitrary angle.

FIG. 10 shows the relationship between the pointing device 301 (tool model 600) and irradiated light when the pointing device 301 (tool model 600) is irradiated with light at a given angle. The same reference numerals in FIG. 10 denote the same parts as those in FIG. 8, and a description thereof will be omitted. In FIG. 10, reference numeral 600a denotes a part corresponding to the pointing part of the pointing device 301. Reference numeral 600b denotes an angle the pointing device 301 makes with the directional light ray direction 800.

When the angle 600b approaches 0°, the shadow of the pointing device 301 becomes a spot, and when a plurality of control panel light sources are set, they are reduced to one control panel light source. When the angle 600b becomes equal to or larger than 90°, light coming from the control panel light source often does not hit the control panel. Hence, the angle 600b has a given range to have 45° as the middle of 0° and 90° as the center.

Figure 14:
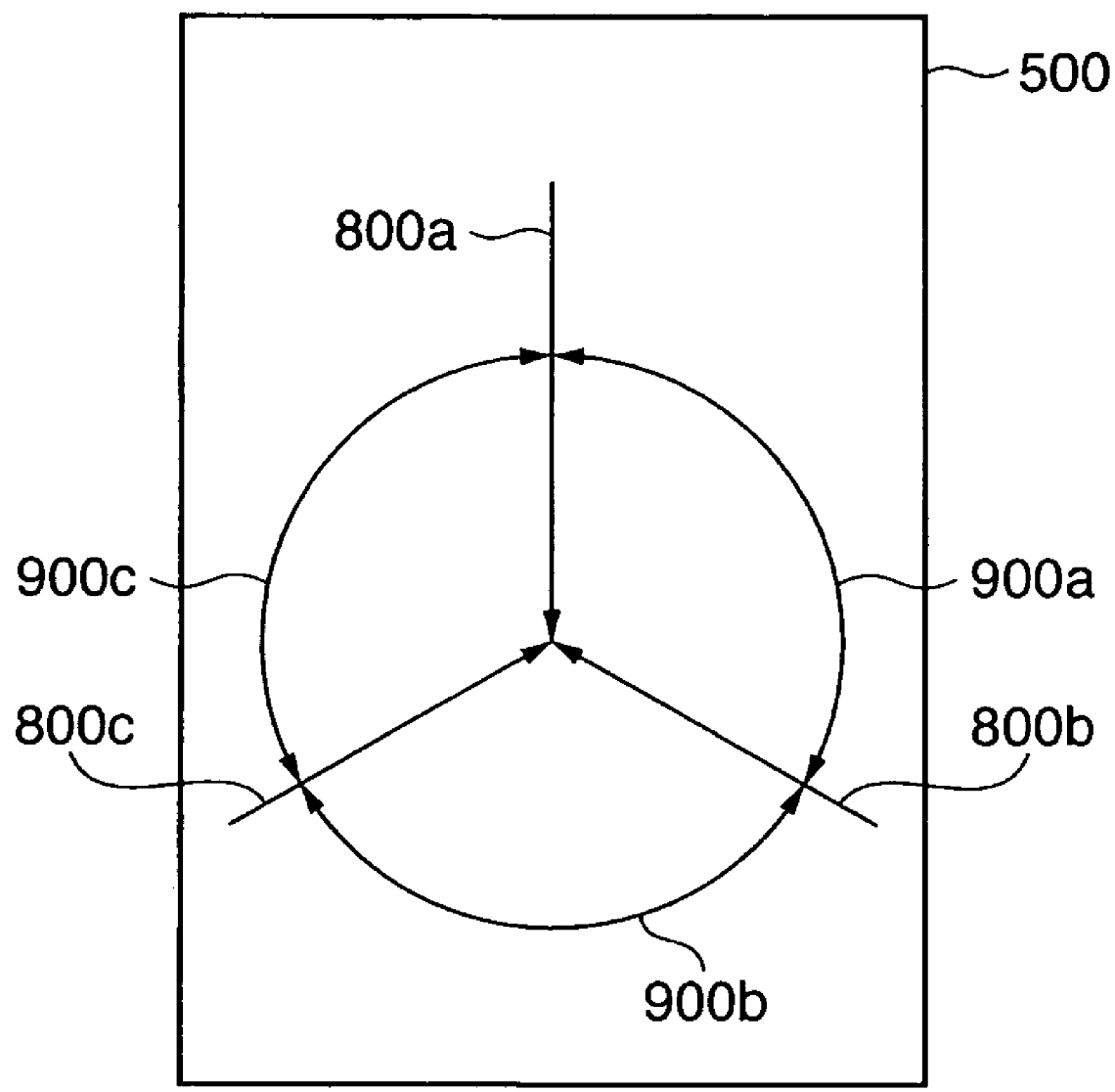
FIG. 14 shows a plurality of directional light ray directions when the plane of the control panel is viewed from an overhead position.

When a plurality of control panel light sources are to be evenly laid out around the longitudinal direction of the tool model 600 as an axis, the angles between neighboring light ray directions of directional light rays 800a, 800b, and 800c from the three control panel light sources shown in FIG. 14 is set to:

900a=900b=900c=360°/m where m is the number of panel light sources.

Note that these control panel light sources may have different types, positions, and directions as long as the shadows can be formed to be easy to see.

As described above, according to the first embodiment, since the light source for the control panel is arranged, and a shadow model is laid out above the control panel, the relative positional relationship between the pointing device and control panel can be visually easily recognized, thus facilitating the manipulation of the pointing device on the control panel.

Note that this embodiment uses a video see-through type HMD but an optical see-through type HMD may be used.

Second Embodiment

In the first embodiment, upon setting the control panel light source on the virtual space, there are two cases, i.e., a case wherein the "irradiation direction from the control panel light source is fixed with respect to the control panel" and a case wherein the "irradiation direction from the control panel light source is fixed with respect to the pointing device 301 (tool model)". However, when the "irradiation direction from the control panel light source is fixed with respect to the control panel", the shadow of the pointing device 301 may become a spot, or the shadow may hide behind the pointing device 301 when viewed from the observer. When the "irradiation direction from the control panel light source is fixed with respect to the pointing device 301 (tool model)", the shadow of the pointing device 301 does not often drop on the control panel depending on the tilt of the pointing device 301.

Therefore, in this embodiment, the position and orientation of the control panel light source are determined based on those of the pointing device, those of the control panel, and those of the head of the observer (those of the display devices 101a and 101b). In the following description, a directional light ray type is used as the type of control panel light source, and the number of control panel light sources is 3. However, the present invention is not limited to them.

Figure 11:
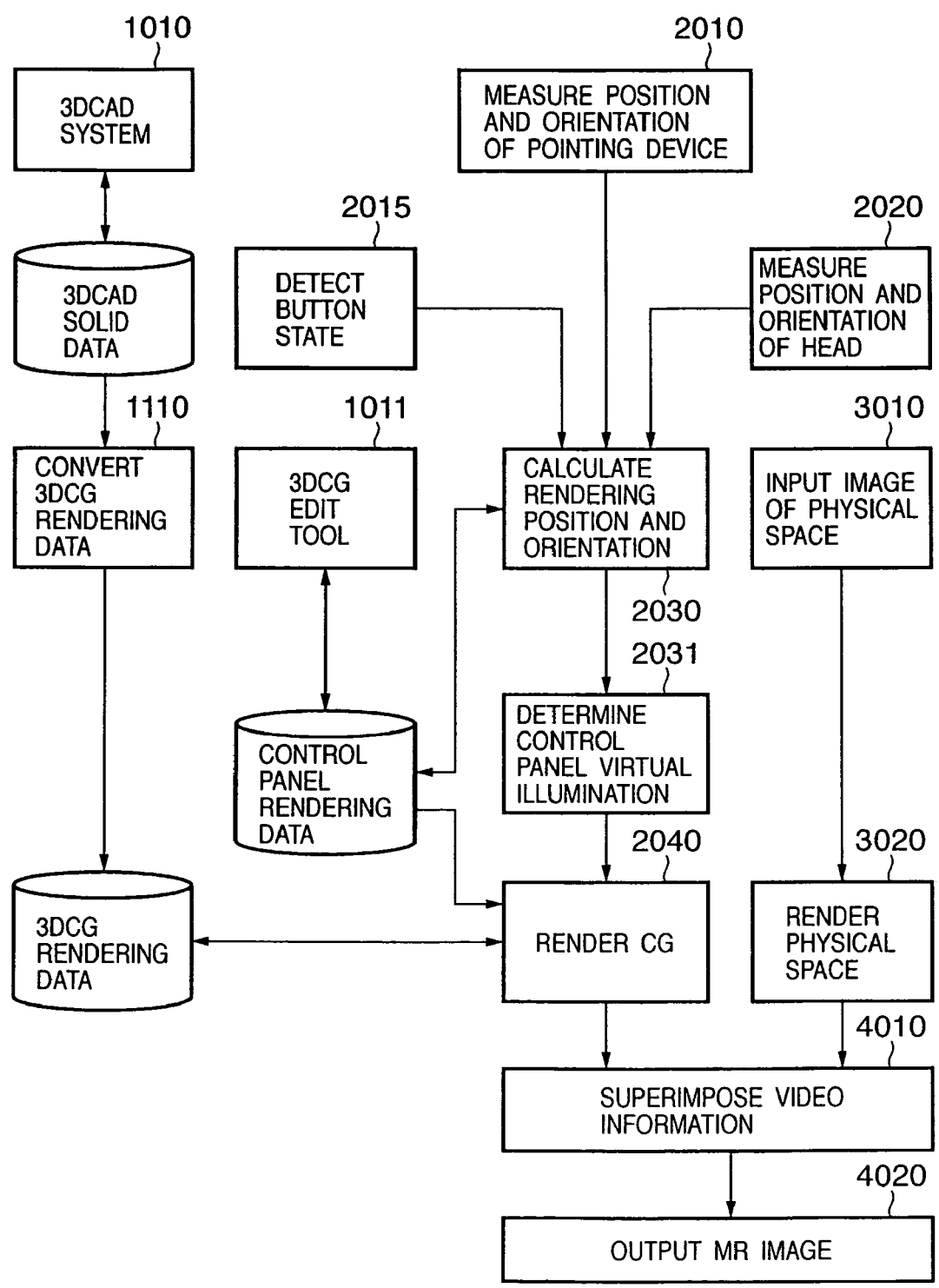
FIG. 11 is a chart showing the flow of generation processing of an image on an MR space.

FIG. 11 is a chart showing the flow of generation processing of an image on the MR space. Note that the same reference numerals in FIG. 11 denote the same processing steps as in FIG. 4, and a description thereof will be omitted.

In processing step 2031, processing for setting each control panel light source based on the position and orientation of the pointing device, those of the control panel, and those of the head of the observer is executed. Upon generating the image of the control panel in processing step 2040, that of the control panel irradiated with light from each control panel light source set in processing step 2031 is generated.

Figure 12:
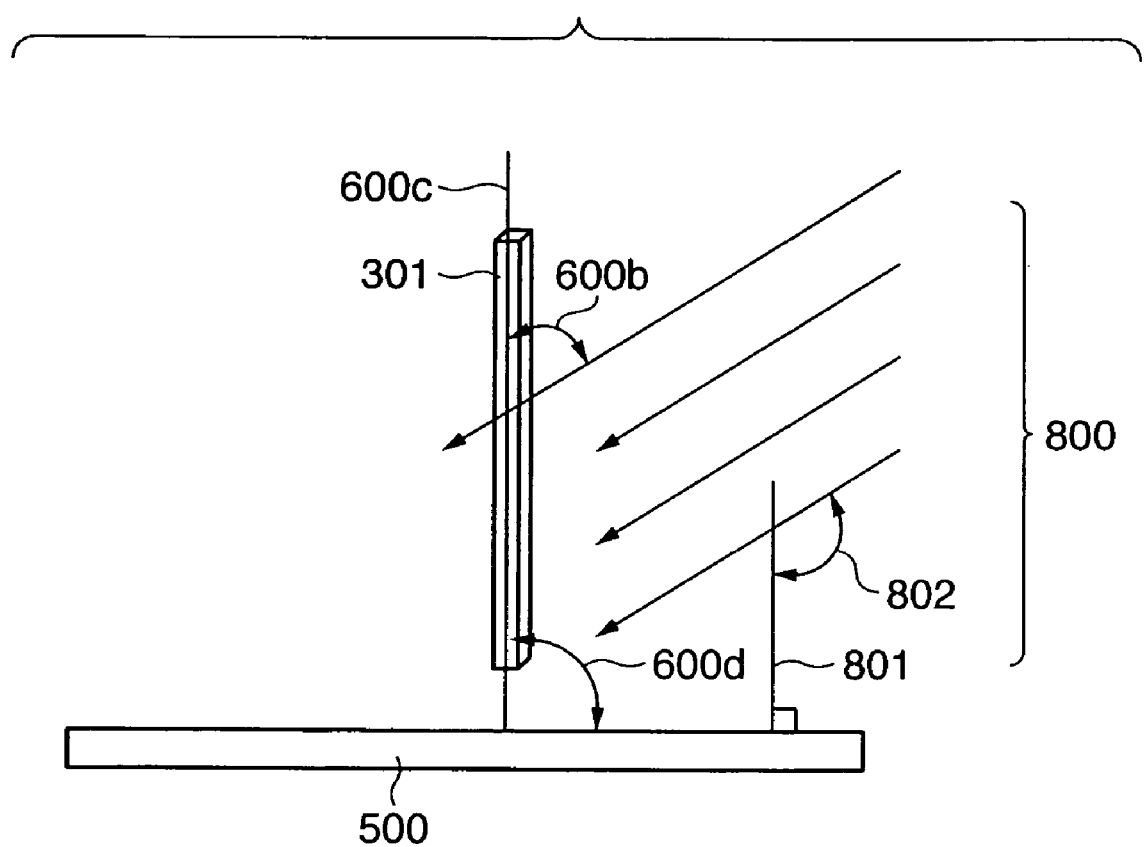
FIG. 12 shows the relationship among the pointing device 301 (tool model 600), the control panel 500, and irradiated light when the pointing device 301 (tool model 600) and the control panel 500 are irradiated with light to form an arbitrary angle.

The method of setting the control panel light source according to this embodiment will be described below with reference to FIG. 12. FIG. 12 shows the relationship among the pointing device 301 (tool model 600), the control panel 500, and irradiated light when the pointing device 301 (tool model 600) and control panel 500 are irradiated with light to have a given angle. The same reference numerals in FIG. 12 denote the same parts as those in FIG. 8, and a description thereof will be omitted.

As shown in FIG. 12, the control panel light source is set so that the angle 600b the irradiation direction 800 makes with the pointing device 301 falls within the range from 0° to 90° (an angle close to 45° as much as possible), and the angle 802 the irradiation direction 800 makes with the normal vector 801 of the control panel 500 falls within the range from 90° to 180° (an angle close to 135° as much as possible). In order to meet these two conditions, for example, one formula is available:

Angle 802=angle 600d/2.0+90° where an angle 600d is an angle an axis 600c of the longitudinal direction of the pointing device 301 makes with the plane of the control panel 500.

The irradiation direction of light coming from the control panel light source is adjusted not to be parallel to a line that connects the head position of the observer and the pointing device 301, so as to prevent the shadow of the pointing device 301 from hiding behind the pointing device 301 when viewed from the observer. For example, when there are a plurality of control panel light sources which are to be evenly laid out, the head of the observer is set to be located at the middle position between these two control panel light sources. This is merely one setting example.

Such setting processing of the control panel light sources is done by the control panel virtual illumination setting unit 410.

As described above, according to the second embodiment, when the light source for the control panel is determined in consideration of the relative positional relationship among the position and orientation of the pointing device, those of the control panel, and those of the head of the observer, the influence of the orientation of the pointing device upon projecting the shadow of the pointing device to be easy to see is reduced, and the shadow of the pointing device is normally prevented from hiding behind the pointing device. Hence, the relative position between the pointing device and control panel can be visually recognized more easily, thus facilitating the manipulation of the pointing device on the control panel.

Third Embodiment

In the description of the first and second embodiments, it is possible to render the shadow of the pointing device which is easy to recognize by using the control panel virtual light illumination determination method. However, depending on the relative position and orientation relationship among the control panel, the pointing device, and the head of the observer, the shadow of the pointing device dropping on the control panel is often difficult to see.

In this embodiment, a method of setting a plurality of light sources so as to form the shadow of the pointing device to be easier to recognize on the control panel will be described.

Figure 13:
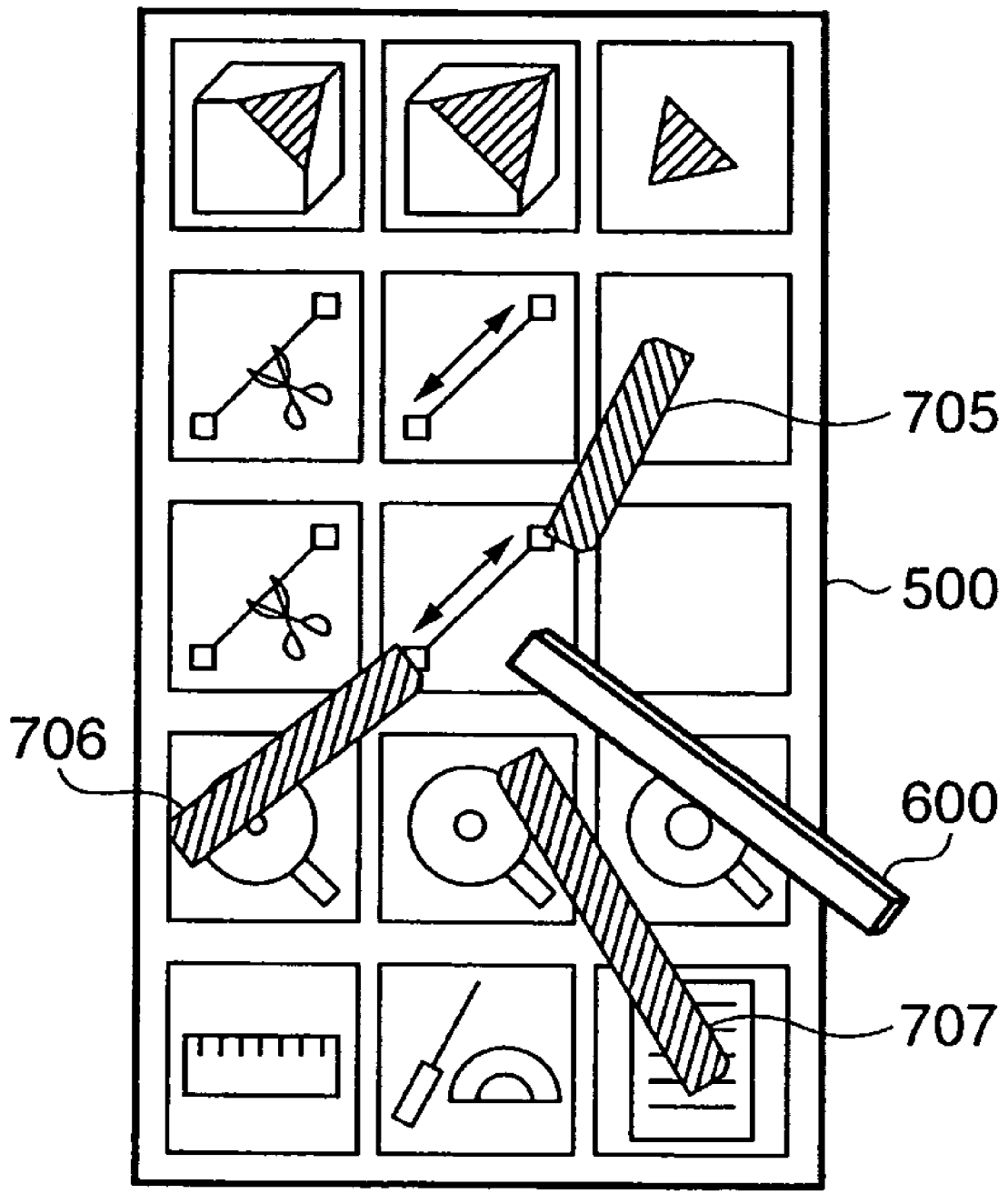
FIG. 13 shows the control panel and an example of the rendering result of the shadows of the pointing device by three light sources.

FIG. 13 shows the control panel and an example of the rendering result of the shadows of the pointing device by three light sources.

In this embodiment, a plurality of control panel light sources are evenly laid out with respect to the plane of the control panel. FIG. 14 shows a plurality of directional light ray directions when the plane of the control panel is viewed from an overhead position. Reference numerals 800a, 800b, and 800c respectively denote directional light rays coming from corresponding panel light sources. Reference numerals 900a, 900b, and 900c denote angles between the neighboring directional light rays 800a, 800b, and 800c. These angles are evenly set to:

900a=900b=900c=360°/n where n is the number of panel light sources.

In the example of this embodiment, the number of light sources is 3. However, the type and number of light sources are not limited to them. Note that the light sources may have different types, positions, and directions as long as the shadows can be formed to be easy to see.

As described above, according to this embodiment, since a plurality of light sources are set upon determining the control panel light sources, the number of shadows that are easy to recognize increases. Hence, the relative position between the pointing device and control panel can be visually recognized more easily, thus facilitating the manipulation of the pointing device on the control panel.

Fourth Embodiment

In the above embodiments, the functional arrangement of the computer 400 is that shown in FIG. 3, and respective units shown in FIG. 3 are implemented by hardware. However, the computer 400 may use a general PC (personal computer), WS (workstation), or the like. In this case, some of the units shown in FIG. 3 may be implemented by software.

Figure 15:
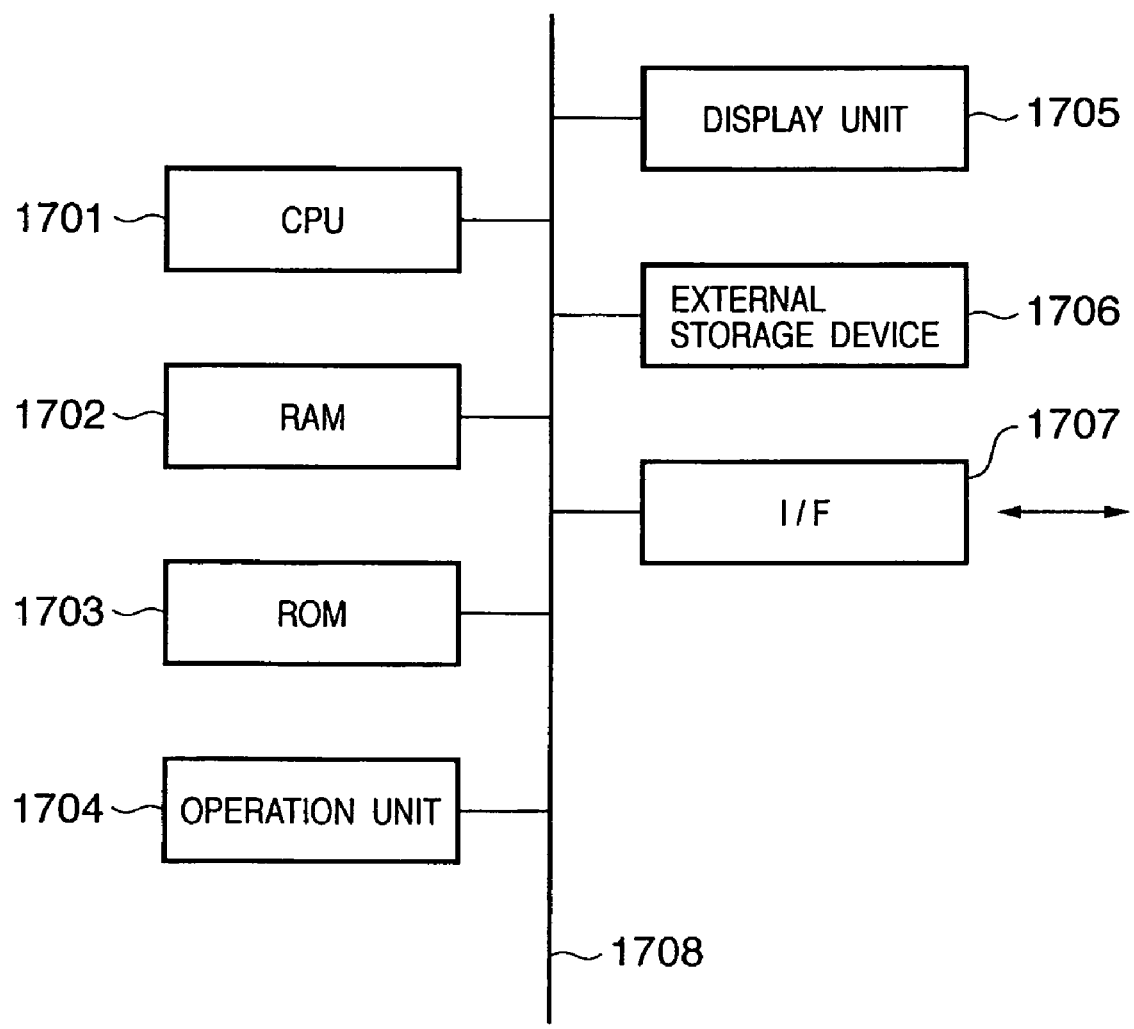
FIG. 15 is a block diagram showing the basic arrangement of the computer 400.

FIG. 15 is a block diagram showing the basic arrangement of the computer 400.

Referring to FIG. 15, reference numeral 1701 denotes a CPU which controls the entire computer 400 using programs and data stored in a RAM 1702 and ROM 1703, and executes respective processes to be done by the computer 400 in the above embodiments.

Reference numeral 1702 denotes a RAM which can provide various areas such as an area for temporarily storing programs and data loaded from an external storage device 1706, an area for temporarily storing data externally received via an I/F 1707, and also a work area used when the CPU 1701 executes various kinds of processing, and the like.

Reference numeral 1703 denotes a ROM which stores setting data, a boot program, and the like, of the computer 400.

Reference numeral 1704 denotes an operation unit which comprises a keyboard and a pointing device such as a mouse or the like, and can input various instructions to the CPU 1701.

Reference numeral 1705 denotes a display unit which comprises a CRT, liquid crystal display, or the like, and can display the processing result of the CPU 1701 by means of images and characters. For example, the image on the MR space to be output to the HMD 100 may be displayed on this display unit 1705 to be presented to the operator of the computer 400.

Reference numeral 1706 denotes an external storage device which serves as a large-capacity information storage device such as a hard disk drive device or the like. The external storage device 1706 saves an OS (operating system), programs required to execute processes to be done by the computer 400 (programs for implementing the functions of respective units except for the DB in FIG. 3), data (data group held by the DB in FIG. 3), and the like. Also, the external storage device 1706 saves data used as given data in the description of the above embodiments.

The programs and data saved in the external storage device 1706 are loaded onto the RAM 1702 under the control of the CPU 1701, and are used by the CPU 1701, so that the computer 400 can execute the processing in the above embodiments.

Reference numeral 1707 denotes an I/F to which the position and orientation measuring device 205, display devices 101a and 101b, cameras 102a and 102b, and the like, are connected. Via this I/F 1707, the computer 400 can make data communications with them. Note that the I/F may be provided for each device, or different I/Fs may be used in correspondence with communication modes with respective devices.

Reference numeral 1708 denotes a bus which interconnects the aforementioned units.

In each of the above embodiments, a series of processes for generating an image on the MR space and providing it to the HMD 100 are executed by a single computer. However, these processes may be appropriately distributed to a plurality of computers.

Fifth Embodiment

In this embodiment, an embodiment of generating a shadow of a physical object on a virtual object will be described, so as to be clarity the positional relationship between a virtual object and a physical object. Noted that this embodiment is the same as the first embodiment, except for the following description.

Figure 16:
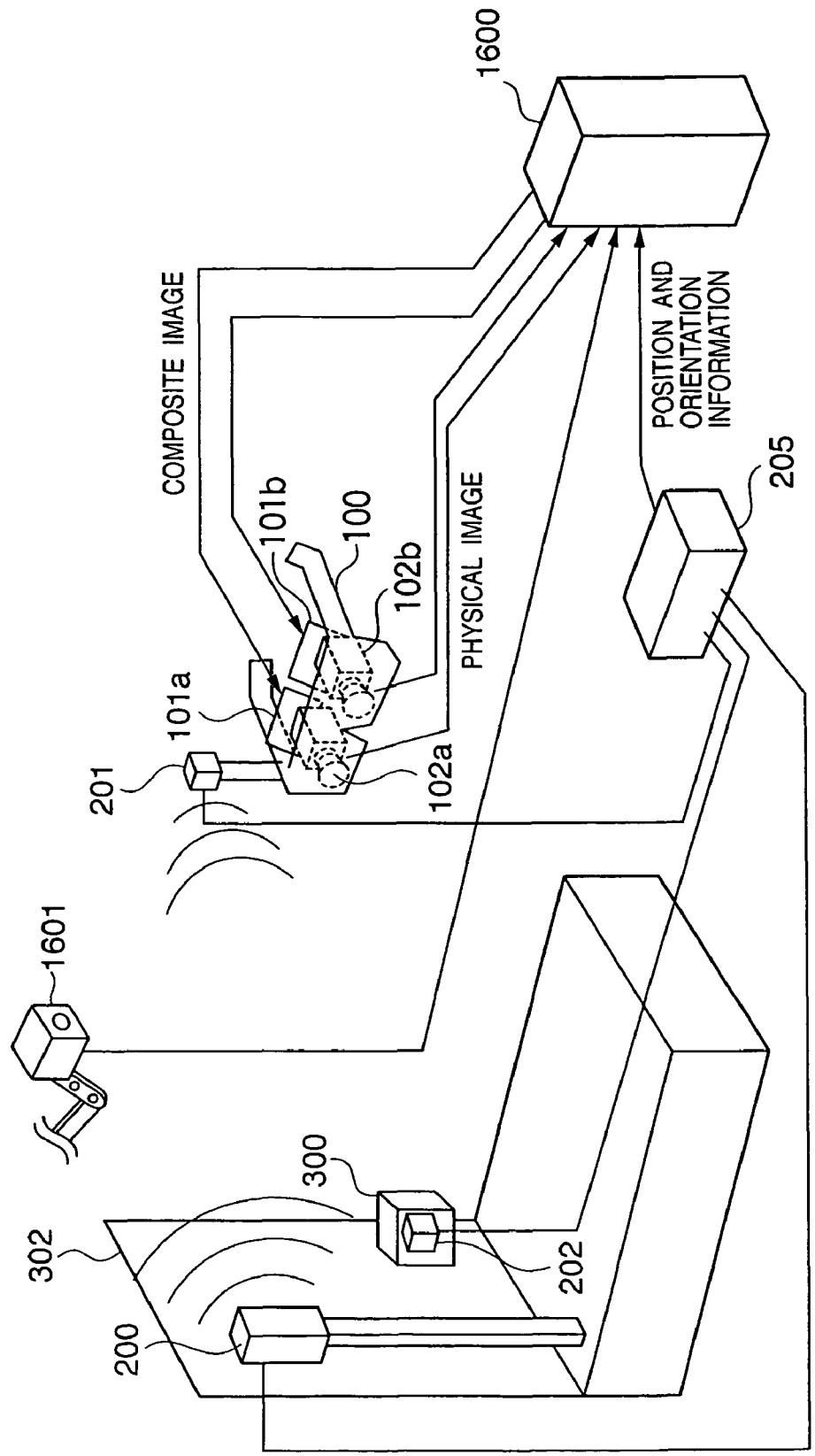
FIG. 16 is a view showing the outer appearance of a system according to the fifth embodiment of the present invention, which provides, to the observer, an MR space obtained by superimposing a virtual space on a physical space and allows the observer to browse and manipulate a virtual object on the virtual space.

FIG. 16 is a view showing the outer appearance of a system according to this embodiment, which provides to the observer an MR space obtained by superimposing a virtual space on a physical space and allows the observer to browse and manipulate a virtual object in the virtual space. The same reference numerals in FIG. 16 denote the same parts as those in FIG. 1, and a description thereof will be omitted.

As shown in FIG. 16, a system according to this embodiment has an arrangement obtained by removing the 3D pointing device 301 and the magnetic receiver 203 and adding camera 1601 (objective viewpoint) which is different from cameras 102a and 102b from the system according to the first embodiment. Furthermore, in this embodiment, instead of the computer 400, a computer 1600 having a functional arrangement different from the computer 400 is used.

The position and orientation of the camera 1601 are fixed. Camera 1601, likewise cameras 102a and 102b, captures movies of a physical space and then outputs each image of the captured frames to computer 1600 sequentially. Noted that data indicated a position and orientation of the camera 1601 is registered in the computer 1600 in advance.

However, the position and orientation of the camera 1601 may be changed dynamically. In the case of changing the position and orientation of the camera 1601 dynamically, it is necessary that a magnetic receiver the same as the magnetic receiver 203 is attached to the camera 1601. According to this arrangement, the position and orientation of the camera 1601 can be obtained by the position and orientation measuring device 205, as position and orientation measuring method by other magnetic receiver. Noted that data indicating the obtained position and orientation of the camera 1601 is inputted to the computer 1600.

Figure 17:
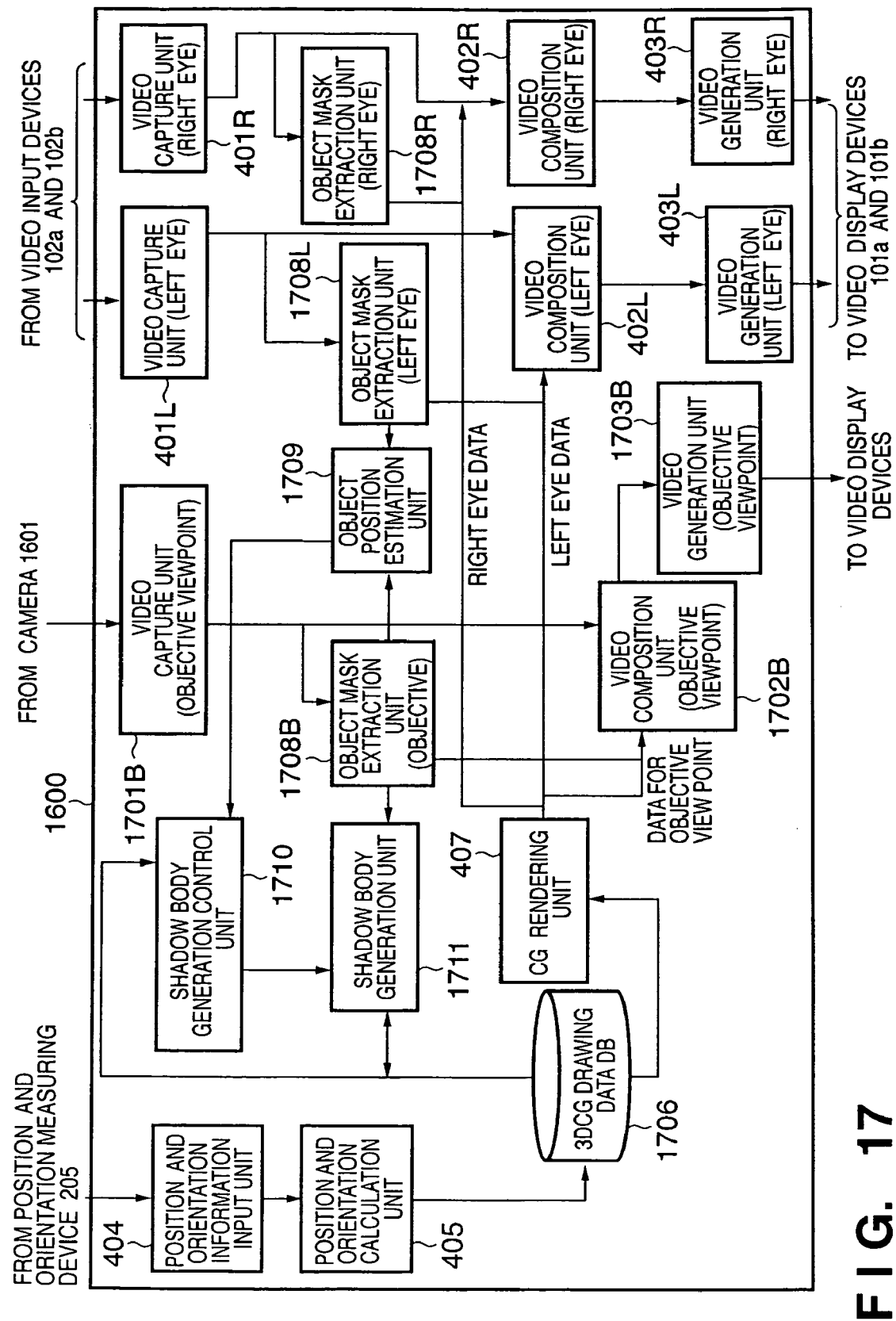
FIG. 17 is a block diagram showing the functional arrangement of a computer 1600.

The functional arrangement of the computer 1600 according to this embodiment will be described. FIG. 17 is a block diagram showing the functional arrangement of this computer 1600. In this embodiment, it is assumed that each unit shown in FIG. 17 is formed by hardware. But, as described in the fourth embodiment, the computer 1600 may be formed by a general PC (personal computer), a WS (workstation), or the like. In the case, some units shown in FIG. 17 may be implemented by software.

Noted that the same reference numerals in FIG. 17 denote the same parts as those in FIG. 3, and a description thereof will be omitted.

In this embodiment, digital signals input from video capture units 401R and 401L are inputted to not only the video composition units 402R and 402L but also an object mask extraction units 1708R and 1708L, respectively. Each of object mask extraction units 1708R and 1708L divides an image expressed by digital signals inputted from each of video capture units 401R and 401L into a region of a physical object set in advance as extraction target and another region respectively. In this embodiment, a "human hand" is used as the physical object. Thus, each of the object mask extraction units 1708R and 1708L extracts pixel groups each pixel having a pixel value of flesh color (a color within given range can be used as flesh color) in an image, and then extracts a region of the extracted pixel group as a hand region.

Basically, operation of each of video composition units 402R and 402L is made the same as in the first embodiment. In this embodiment, an image of a virtual object is not superimposed on a region extracted by each of the object mask extraction units 1708R and 1708L. Various techniques can be adapted as such processing technique, for example, upon rendering a virtual object image on a physical space image by using OpenGL, it can be realized by assigning a mask image (an image obtained by masked a hand region) to a stencil buffer.

MR images for the right eye obtained without composing an image of a virtual object on the hand region, is output from the video composition unit 402R to the video generation unit 403R. MR images for the left eye obtained without composing an image of a virtual object on the hand region, is output from the video composition unit 402L to the video generation unit 403L. Since video generation units 403R and 403L operate as described in the first embodiment, such MR images for the left eye and the right eye are displayed on screens of video display devices 101a and 101b respectively.

Data output from the position and orientation measuring device 205 is inputted to the position and orientation information input unit 404, as described in the first embodiment. In this embodiment, the data includes data indicating a position and orientation of the magnetic receiver 201 on a sensor coordinate system and data indicating a position and orientation of the magnetic receiver 202 provided on the 3D pointing device 300 on the sensor coordinate system. Dynamically changing the position and orientation of the camera 1601 data indicating a position and orientation of the camera 1601 on the sensor coordinate system is included.

The position and orientation calculation unit 405 operates as described in the first embodiment. In the case of dynamically changing a position and orientation of the camera 1601, using data indicating a position and orientation of the camera 1601 on the sensor coordinate system and the conversion data, the position and orientation of the camera 1601 in the virtual space is calculated by using well-known calculation.

Reference numeral 1706 denoted a 3DCG drawing data DB. The 3DCG drawing data 1706 DB is a DB (database) of data (3DCG drawing data) used to generate images of each virtual object (including a virtual object to be observed and a shadow model described later) composing a virtual space. The 3DCG drawing data includes data indicating a geometric shape and color of a virtual object, texture data, and data indicating a position and orientation, and the like. The 3DCG drawing data also includes data (data of type of a light source, a position of a light source, irradiate direction, and the like) of a light source used to irradiate a virtual space with light and a light source used to generate a shadow model. In the case of fixing a position and orientation of the camera 1601, data of the fixed position and orientation is stored in the 3DCG drawing data DB 1706 in advance.

Reference numeral 1701B denotes a video capture unit. The video capture unit 1701B receives an image input from the camera 1601 as digital signal. The received signal is output to a video composition unit 1702B and an object mask extraction unit 1708B. The object mask extraction unit 1708B is same as the object mask extraction units 1708R and 1708L, and divides an image input from the video capture unit 1701B into a hand region and another region.

The video composition unit 1702B operates the same as video composition units 402R and 402L, but does not render an image of a virtual object on the region extracted by the object mask extraction unit 1708B. This is, an image of a physical space captured by camera 1601 is input from the video capture unit 1701B to the video composition unit 1702B, and an image of a virtual object viewed according to a position and orientation of the camera 1601 is inputted from the CG rendering unit 407. The CG rendering unit 407 basically operates as described in the first embodiment, and furthermore generates an image of a virtual space viewed according to a position and orientation of camera 1601. Hence, the video composition unit 1702B generates a MR space image viewed according to a position and orientation of camera 1601. An image of a MR space obtained without superimposing an image of a virtual object on a hand region is output from the video composition unit 1702B to the video generation unit 1703B. The video generation unit 1703B operates the same as video generation units 403R and 403L to output an image of a MR space viewed according to a position and orientation of a camera 1601 to, e.g. a display device (not shown) which third party, who does not wear the HMD 100 on his or her head, can watch.

Figure 18:
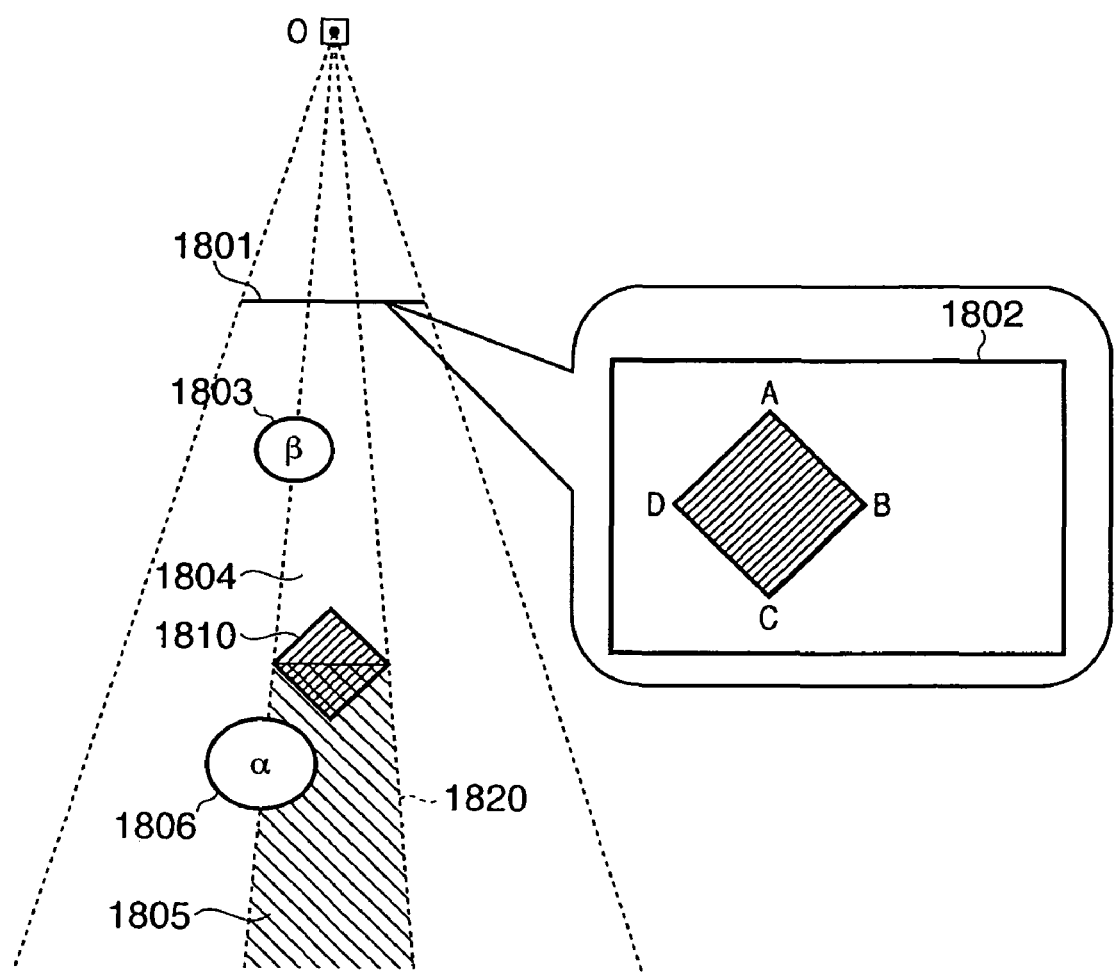
FIG. 18 shows a scheme for generating a shadow of a physical object on a virtual object.

The processing performed by a object position estimation unit 1709, a shadow body generation control unit 1710, and a shadow body generation unit 1711 for drawing a shadow of "hand" as an example of a physical object on a virtual object, will be described below using FIG. 18. FIG. 18 shows a scheme for generating shadow of a physical object on a virtual object.

In the FIG. 18, o denotes a position where a light source is arranged for generating a shadow model described later. In this embodiment, the light source is arranged at a position and orientation of camera 1601. Since the position and orientation of the camera 1601 is registered in the 3DCG drawing data DB 1706 in advance or is calculated by the position and orientation calculation unit 405, the light source is arranged at the registered/calculated position and orientation.

In the FIG. 18, reference numeral 1801 denoted a capturing plane of camera 1601, a captured image is projected onto the captured plane. Reference numeral 1810 denotes a physical object. A "hand" is used as the physical object 1810 in this embodiment, but a cube is used herein for the sake of simplicity.

Reference numerals 1803 and 1806 are virtual objects (β, α) respectively. A position of the virtual object 1803 is nearer the position o of the light source than a position of the physical object 1810. A position of the virtual object 1806 is further away from the position o of the light source than a position of the physical object 1810.

Reference numeral 1802 denotes a mask image of a physical space image captured by the camera 1601. The mask image 1802 is generated, by the object mask extraction unit 1708B, from a physical space image projected onto the capturing plane 1801.

In the case of such a situation, limited numbers of sample points are set first on an outline of a physical object on a mask image. It is assumed that vertices of the physical object 1810 are A, B, C, and D as sample points, respectively. However, method of setting sample points is not limited to a specific method. For example, each sample point can be set at a position where a radius of curvature is equal to or less than a predetermined value upon tracing the outline. Each sample point can be set so that an interval between sample points is a constant while tracing.

Then, a region surrounded by lines extending from each of sample points to a position of a light source is obtained. In FIG. 18, the region to be obtained is a petrosa region surrounded by planes OAB, OBC, OCD, and ODA. A virtual object indicating a region of the petrosa is a shadow model (shadow body). In FIG. 18, reference numeral 1820 denotes the shadow model.

As physical phenomenon, a shadow of the physical object 1810 is occurred in a region 1805 of a region within the shadow model 1820, this is, in a region, of a region within the shadow model 1820, is further away from the position o of the light source than a position of the physical object 1810. A shadow of the physical object 1810 is not occurred in a region 1804, this is, in a region, of a region within the shadow model 1820, is nearer the position o of the light source than a position of the physical object 1810.

As described above, even a virtual object partially or fully is included in the shadow model 1820, shadow of the physical object 1810 is generated at a partially obscured area of the virtual object or not generates according to situation where a partially obscured area of the virtual object is in the region 1804 or 1805.

Thus, the following two determining processing are required upon generating shadow of the physical object 1810 on a virtual object.

whether partially or fully a virtual object is included in the shadow model 1820.

whether or not a position of partially obscured area of the virtual object is further away from the position o of the light source than a position of the physical object 1810.

If partially or fully a virtual object is included in the shadow model 1820 and a position of partially obscured area of the virtual object is further away from the position o of the light source than a position of the physical object 1810, shadow for the partially obscured area of the virtual object is generated.

The generation processing of the shadow will be described in detail.

The object position estimation unit 1709 receives a mask image of the left eye physical space image from the object mask extraction unit 1708L, and receives a mask image of physical space image captured by the camera 1601 from the object mask extraction unit 1708B. The object position estimation unit 1709 estimates a position of a masked target physical object (i.e. "hand") on each of the two mask images, using a principle of well-known triangulation. Noted that two or more mask images can be used for estimating a position of the "hand". In the case, for example, a mask image of a right eye physical space image is also inputted to the object position estimation unit 1709, and then the object position estimation unit 1709 may estimate a position of a "hand" according to the above processing using three mask images including the mask image.

Note that the estimation processing of a position of "hand" will be described in more detail. Processing for calculating a line extending from a position of the center of gravity of a mask region ("hand" region) in a mask image to a focus position of a camera capturing a physical space image used to obtain the mask image is performed for each mask image. In this embodiment, processing for calculating a line extending from a position of the center of gravity of a "hand" region in a mask image generated by the object mask extraction unit 1708B to a focus position of the camera 1601 and calculating a line extending from a position of the center of gravity of a "hand" region in a mask image generated by the object mask extraction unit 1708L to a focus position of the video input device 102b is performed. A portion (for example, middle point of points on the calculated lines when each of the points are closest to each other) where each of the calculated lines is closest to each other is estimated as a position of the "hand". Even if three or more lines are calculated, a portion where each of the lines is closest to each other is estimated as a position of the "hand".

Then, the shadow body generation control unit 1710 compares a position of each virtual object constructing a virtual space with previously estimated position of the "hand". A position of a virtual position is obtained by referring the 3DCG drawing data DB 1706, since the position of the virtual object is registered in the 3DCG drawing data DB 1706 in advance if the position of the virtual object is determined in advance. A position of the pointing device 202 measured by the magnetic receiver 300 can be used as a position of a virtual object associated with the pointing device 202.

The shadow body generation unit 1711 is controlled to generate the shadow model, if there is a virtual object positioned further from a position of the "hand" viewed from a position "o" of a light source.

If a virtual object, positioned further from a position of the "hand" viewed from a position "o" of a light source, is partially at least included with a shadow model, the shadow body generation unit 1711 is controlled to generate the shadow model for partially obscured area of the virtual object. The generation method of a shadow is not limited to a specific method. For example, a black texture having a given transparency can be mapped onto partially obscured area of the virtual object. As another method, brightness of factors (for example, polygon) constructing partially obscured area of the virtual object can be reduced. By performing such shadow generation processing, data (stored in the 3DCG drawing data DB 1706) according to the virtual object is updated.

Note that detection of a partially obscured area of one virtual object included in the other virtual object is a well-known technique as determination of collision between characters used generally in video games, and the like.

The CG rendering unit 407 arranges each virtual object in the virtual space using data stored in the 3DCG drawing data DB 1706. Upon arranging each virtual object, shadows are generated for a partially obscured area of a virtual object positioned further from a position of the "hand" viewed from a position "o" of a light source.

Note that if a plurality of virtual objects are arranged in the virtual space, shadows for each virtual object can be generated by performing above described processing for each virtual object the above described processing can be performed for only most-watched virtual objects (e.g. a virtual object positioned at the center of a field of view of either the right eye or the left eye of a video capture device).

In the latter case, the shadow body can be provided for only a virtual object, or for all CG objects. These selections should be determined based on an object of an implemented system and drawing performance and the like.

Note that in this embodiment the shadow model may or may not be displayed. In the case of displaying the shadow model, the shadow model may be always displayed without performing two-comparison processing.

Sixth Embodiment

In the fifth embodiment, a light source used to irradiate the virtual space with light is different from a light source used to generate a shadow model. However, it is not limited to a specific case, and a common light source may be used as a light source used to irradiate the virtual space with light and a light source used to generate a shadow model. That is, only light source arranged at a position and orientation of the camera 1601 may be used.

Other Embodiments

The embodiments can be practiced in the forms of a system, apparatus, method, program, storage medium, and the like. Also, the embodiments can be applied to either a system constituted by a plurality of devices, or an apparatus consisting of a single equipment.

Note that the processes of the embodiments are achieved by directly or remotely supplying a program of software that implements the functions of the aforementioned embodiments (programs corresponding to the flowcharts shown in the above drawings in the embodiments) to a system or apparatus, and reading out and executing the supplied program code by a computer of that system or apparatus.

Therefore, the program code itself installed in a computer to implement the functional processing of the embodiments using the computer implements the present invention. That is, the present invention includes the computer program itself, which is installed on a computer, for implementing the functional processing of the embodiments by the computer.

In this case, the form of program is not particularly limited, and an object code, a program to be executed by an interpreter, script data to be supplied to an OS, and the like, may be used as along as they have the program function.

As a recording medium for supplying the program, for example, a Floppy® disk, hard disk, optical disk, magneto-optical disk, MO, CD-ROM, CD-R, CD-RW, magnetic tape, nonvolatile memory card, ROM, DVD (DVD-ROM, DVD-R), and the like, may be used.

As another program supply method, the program may be supplied by establishing connection to a home page on the Internet using a browser on a client computer, and downloading the computer program itself of the embodiments or a compressed file containing an automatic installation function from the home page onto a recording medium such as a hard disk or the like. Also, the program code that forms the program of the embodiments may be segmented into a plurality of files, which may be downloaded from different home pages. That is, the embodiments include a WWW server which makes a plurality of users download a program file required to implement the functional processing of the present invention by the computer.

Also, a storage medium such as a CD-ROM or the like, which stores the encrypted program of the embodiments, may be delivered to the user, the user who has cleared a predetermined condition may be allowed to download key information that decrypts the program from a home page via the Internet, and the encrypted program may be executed using that key information to be installed on a computer, thus implementing the embodiments.

The functions of the aforementioned embodiments may be implemented not only by executing the readout program code by the computer but also by some or all of actual processing operations executed by an OS or the like running on the computer on the basis of an instruction of that program.

Furthermore, the functions of the aforementioned embodiments may be implemented by some or all of actual processes executed by a CPU or the like arranged in a function extension board or a function extension unit, which is inserted in or connected to the computer, after the program read out from the recording medium is written in a memory of the extension board or unit.

As many apparently widely different embodiments of the present invention can be made without departing from the spirit and scope thereof, it is to be understood that the invention is not limited to the specific embodiments thereof except as defined in the appended claims.

This application claims the benefit of Japanese Applications No. 2005-193077, filed Jun. 30, 2005 and No. 2005-356681, filed Dec. 9, 2005, which are hereby incorporated by reference herein in their entirety.

What is claimed is:

1. An image processing method comprising:
a first setting step of setting a first virtual light source used to irradiate a virtual space with light;
a layout step of laying out a virtual object in the virtual space;
a first acquiring step of acquiring a position and orientation of a viewpoint of an observer;
a generation step of generating an image of the virtual space, irradiated with light from the first virtual light source, viewed from a viewpoint having the position and orientation acquired in the first acquiring step;
a second acquiring step of acquiring a position and orientation of an objective viewpoint, wherein the objective viewpoint is different from the viewpoint of the observer;
a second setting step of setting a second virtual light source which is laid out at the acquired position and orientation of the objective viewpoint and is used to generate, in the virtual space, a shadow of a physical tool object, wherein the physical tool object is manipulated by the observer so that the second virtual light source irradiates the physical tool object at an angle;
a third acquiring step of acquiring a position and orientation of the physical tool object;
a shadow generation step of generating, in the virtual space, a shadow of the physical tool object based on the second virtual light source;
a calculating step of calculating a region surrounded by a plurality of lines extending from a position of the second virtual light source to an outline of the physical tool object;
a first determining step of determining whether or not the virtual object is partially or fully included in the region;
a second determining step of determining whether or not a position of the virtual object is further away from a position of the second virtual light source than a position of the physical tool object;
and a generating step of generating using a generation unit, if the virtual object is partially or fully included in the region and a position of the virtual object is further away from a position of the second virtual light source than a position of the physical tool object, a shadow on an area of the virtual object included in the region.

2. The method according to claim 1, wherein the first virtual light source and the second virtual light source are different from each other.

3. The method according to claim 1, wherein the virtual object is a control panel.

4. A non-transitory computer-readable storage medium storing a program to make a computer execute an image processing method of claim 1.

5. An image processing apparatus, comprising:
a first setting unit adapted to set a first virtual light source used to irradiate a virtual space with light;
a layout unit adapted to lay out a virtual object in the virtual space;
a first acquiring unit adapted to acquire a position and orientation of a viewpoint of an observer;
a generation unit adapted to generate an image of the virtual space, irradiated with light from the first virtual light source, viewed from a viewpoint having the position and orientation acquired by said first acquiring unit;
a second acquiring unit of acquiring a position and orientation of an objective viewpoint, wherein the objective viewpoint is different from the viewpoint of the observer;
a second setting unit adapted to set a second virtual light source which is laid out at the acquired position and orientation of the objective viewpoint and is used to generate, in the virtual space, a shadow of a physical tool object, wherein the physical tool object is manipulated by the observer so that the second virtual light source irradiates the physical tool object at an angle;
a third acquiring unit adapted to acquire a position and orientation of the physical tool object;
a shadow generation unit adapted to generate, in the virtual space, a shadow of the physical tool object based on the second virtual light source;

a calculating unit adapted to calculate a region surrounded by a plurality of lines extending from a position of the second virtual light source to an outline of the physical tool object;

a first determining unit adapted to determine whether or not the virtual object is partially or fully included in the region;

a second determining unit adapted to determine whether or not a position of the virtual object is further away from a position of the second virtual light source than a position of the physical tool object; and a shadow lay out unit adapted to lay out, if the virtual object is partially or fully included in the region and a position of the virtual object is further away from a position of the second virtual light source than a position of the physical tool object, an image indicating a shadow on an area of the virtual object included in the region.

* * * * *